United States Patent [19]

Baugh et al.

[11] 4,251,880
[45] Feb. 17, 1981

[54] DIGITAL LOOP SWITCH FOR CONTROLLING DATA INFORMATION HAVING DIFFERING TRANSMISSION CHARACTERISTICS

[75] Inventors: Charles R. Baugh, Lincroft; Robert M. Smith, Holmdel, both of N.J.

[73] Assignee: Bell Telephone Laboratories, Incorporated, Murray Hill, N.J.

[21] Appl. No.: 62,423

[22] Filed: Jul. 31, 1979

[51] Int. Cl.³ .............................................. H04J 6/02
[52] U.S. Cl. ..................................... 370/80; 370/79; 370/86; 370/89; 370/94
[58] Field of Search ....................... 370/19, 60, 79, 80, 370/86, 94, 102, 108, 89, 95

[56] References Cited

U.S. PATENT DOCUMENTS

| 3,641,273 | 2/1972 | Herold | 370/80 |
| 3,781,478 | 12/1973 | Blahut | |
| 3,796,835 | 3/1974 | Closs | 370/94 |
| 4,096,355 | 6/1978 | Rothauser | 370/94 |
| 4,154,983 | 5/1979 | Pederson | 370/94 |

OTHER PUBLICATIONS

IEEE Transactions on Communications; vol. COM-24, No. 10; pp. 1089-1180; Oct. 1976; "Distributed Processing Within . . . Circuit/Packet-Switching Node," by Jenny et al.

Primary Examiner—David L. Stewart
Attorney, Agent, or Firm—David H. Tannenbaum

[57] ABSTRACT

There is disclosed a digital loop for interconnecting a number of data interchangers, each data interchanger connectable over a single high speed communication link to a remote station controller. The high speed link is arranged to bidirectionally transfer both bursty and continuous data to and from the data interchanger. A central controller is serially inserted in the digital loop and serves to assign time slots in a frame for information exchange between the various programmable data interchangers. Each frame contains a first field for data interchange between the data interchangers and the central controller; a second field having time slots assignable under control of the controller to a specific set of data interchangers for transferring information from the continuous data inputs; and a third field having time slots assignable under control of each data interchanger for transferring information from the bursty data input. The controller in cooperation with the data interchangers varies the size of the fields of each frame such that the portion of the field associated with continuous communication expands and contracts as traffic flow changes thereby increasing or decreasing the number of time slots available for the transfer of bursty data.

1 Claim, 25 Drawing Figures

FIG. 2
PSC-PDI PROTOCOL

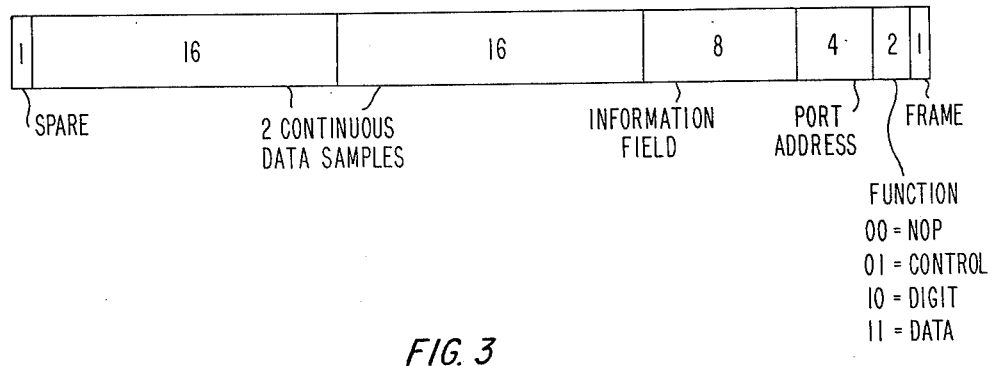

| 1 | 16 | 16 | 8 | 4 | 2 | 1 |

- SPARE
- 2 CONTINUOUS DATA SAMPLES
- INFORMATION FIELD
- PORT ADDRESS
- FRAME

FUNCTION
00 = NOP
01 = CONTROL
10 = DIGIT
11 = DATA

FIG. 3
CONTROL CODES

| HEX CODE | MEANING | |
|---|---|---|
| 00 | ON-HOOK | DATA |
| 01 | OFF-HOOK | |
| 02 | DIAL TONE | |
| 03 | START RINGING | |
| 04 | STOP RINGING | |
| 05 | RING-BACK | |
| 06 | BUSY | |
| 07 | RE-ORDER | |
| 08 | CONNECTION | |
| 09 | INVOKE FLOW CONTROL | |
| 0A | CANCEL FLOW CONTROL | |
| 0B | TRANSMIT "BREAK" | |
| 0C-0F | (SPARES) | |
| 10 | ACK | SYSTEM |
| 11 | NAK | |
| 12 | RESET | |
| 13 | STATUS INQUIRY | |
| 14-1F | (SPARES) | |
| 20 | ON-HOOK | VOICE |
| 21 | OFF-HOOK | |
| 22 | START RINGING | |
| 23 | STOP RINGING | |
| 24 | DISCONNECT | |
| 25-2F | (SPARES) | |
| 1 0 X X X X X X | RS-232 C CONTROL | DATA |

- REQSD
- DTRDY
- SRSND
- SSDAT

FIG. 4
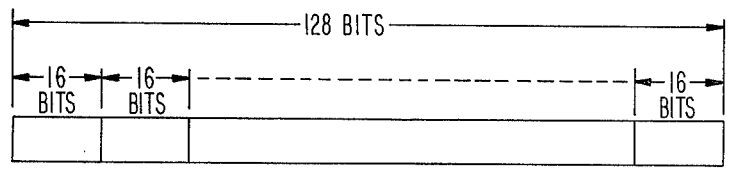
FIG. 5
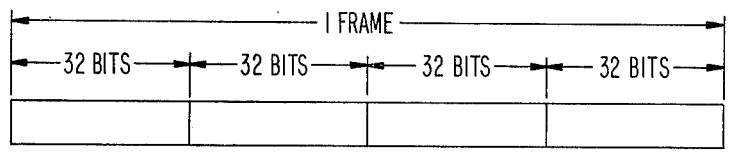
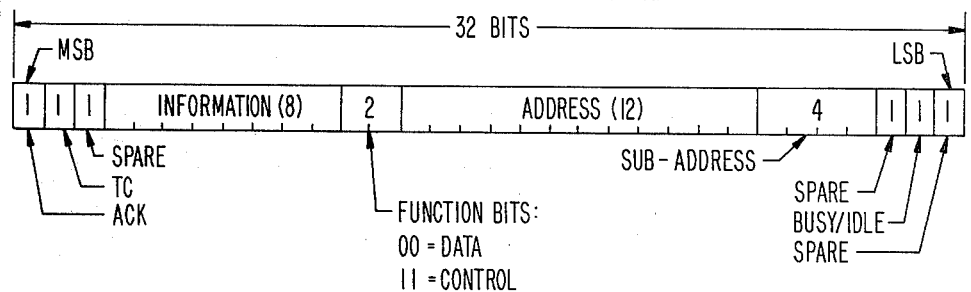
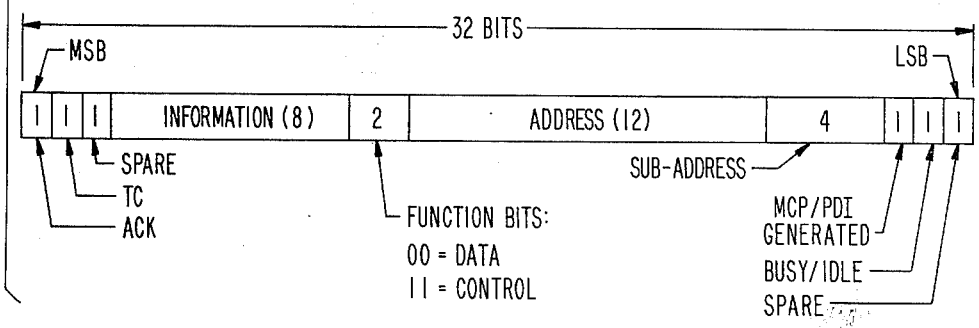

FIG. 7 PDI PROCESSOR 700

FIG 17 MCPI PROCESSOR 1700

MCPI USART 2300

DIGITAL LOOP SWITCH FOR CONTROLLING DATA INFORMATION HAVING DIFFERING TRANSMISSION CHARACTERISTICS

BACKGROUND OF THE INVENTION

This invention relates to the problem of transmitting varying types of data between stations connected in a digital loop format.

The ability to transfer data from one point to another is fast becoming the backbone of our industrialized society. As data transmission becomes more and more popular the level of sophistication required also rises. Thus, we find a situation developing wherein, especially in the business environment, any terminal connected to the switching network must be capable of handling any type of data presented to it in an efficient and universal manner.

While such remains the goal, the problem is compounded in that the data from differing types of equipments arrive at the data terminal in differing forms and at differing rates. For example, data which is representative of speech is usually continuous in nature. For this reason it follows that when voice data is being transmitted it is necessary to establish a continuous or "circuit switched" connected through the network. On the other hand, data from a computer terminal or from a temperature sensor, arrives in spurts and is thus "bursty" in nature. Such bursty data must be immediately forwarded when it appears at the terminal, but due to its bursty or noncontinuous nature many such independent bursty data inputs may be interleaved in a given period of time.

One solution to the problem of handling both continuous and bursty data types is shown in the commonly assigned co-pending patent application filed concurrently herewith, Ser. No. 062,422.

Using the teachings of said co-pending application, which is hereby incorporated by reference as though completely reproduced herein, both bursty and continuous data are interleaved on a single channel from a group of stations located at a common point. The interleaving occurs under control of a programmable station controller. The problem then remains to distribute the data to the proper receiving stations via the receiving station's programmable station controller. To state the combined from each location onto a single data loop channel that data must be separated and delivered to the proper destination. Thus, a delivery system must be designed to separate the bursty data from each frame and to deliver that data packet to the proper address. Since the destination address will change with each word frame, dedication of time slots in the delivery system becomes difficult and a housekeeping nightmare. At the same time it is important to reserve space in each delivery frame for the transmission of the continuous data, which for any one call must be delivered to the same location on each frame.

Digital loop systems designed in a backplane mode solve many of the problems of data delivery to various locations within a definable grouping of stations and such systems are now well known in the art. For example it is known to handle bursty data in a packetized manner. One example of such a packet switched digital loop is T. J. Pedersen U.S. Pat. No. 4,154,983. A loop scheme for continuous data transfer is shown in D. E. Blahut et al. U.S. Pat. No. 3,781,478. While each of these schemes adequately handle the type of information transfer for which they are designed, each has problems handling data of the other type. These problems arise primarily because of the diametrically opposed traffic characteristics of each data type.

The above-mentioned Pedersen disclosure recognizes the problem of handling different type data within each frame by separating the two types of data. However, in Pedersen the central controller performs all of the control functions and thus each word must be assigned first to the time slot associated with the transmitting station and then, under control of the controller, be moved to the time slot assigned to the receiver station. This places a large load on the controller and effectively reduces the amount of traffic that can be handled. In addition, since the data interchange between the stations is controlled by the central controller, only one such interchange may occur in any given frame.

SUMMARY OF THE INVENTION

These and other problems are solved by one embodiment of our invention where a digital loop system is arranged to dynamically configure the network so that as the types of traffic on the switching network change the characteristics of the digital network change to accommodate the traffic. As designed, the digital loop controller assigns, on a semipermanent basis, a particular time slot to a particular set of terminals for the duration of any circuit-switched call. At that point the controller no longer is involved in the connection and the individual data interchangers handle the traffic. For data interchange on bursty type data, the individual interchangers themselves are free to assign certain time slots, on a one frame basis, for efficient data interchange. Thus, since control of the time slot assignment is under localized control more than one such interchange may occur in any given frame.

BRIEF DESCRIPTION OF THE DRAWING

These and other objects and features together with the operation and utilization of the present invention will be more fully apparent from the illustrative embodiment shown in conjunction with the drawing, in which:

FIGS. 2 and 3 show the PSC-PDI protocol and control codes;

FIGS. 4 and 5 show the data bus protocol and frame layout;

GENERAL DESCRIPTION

Figure 1:
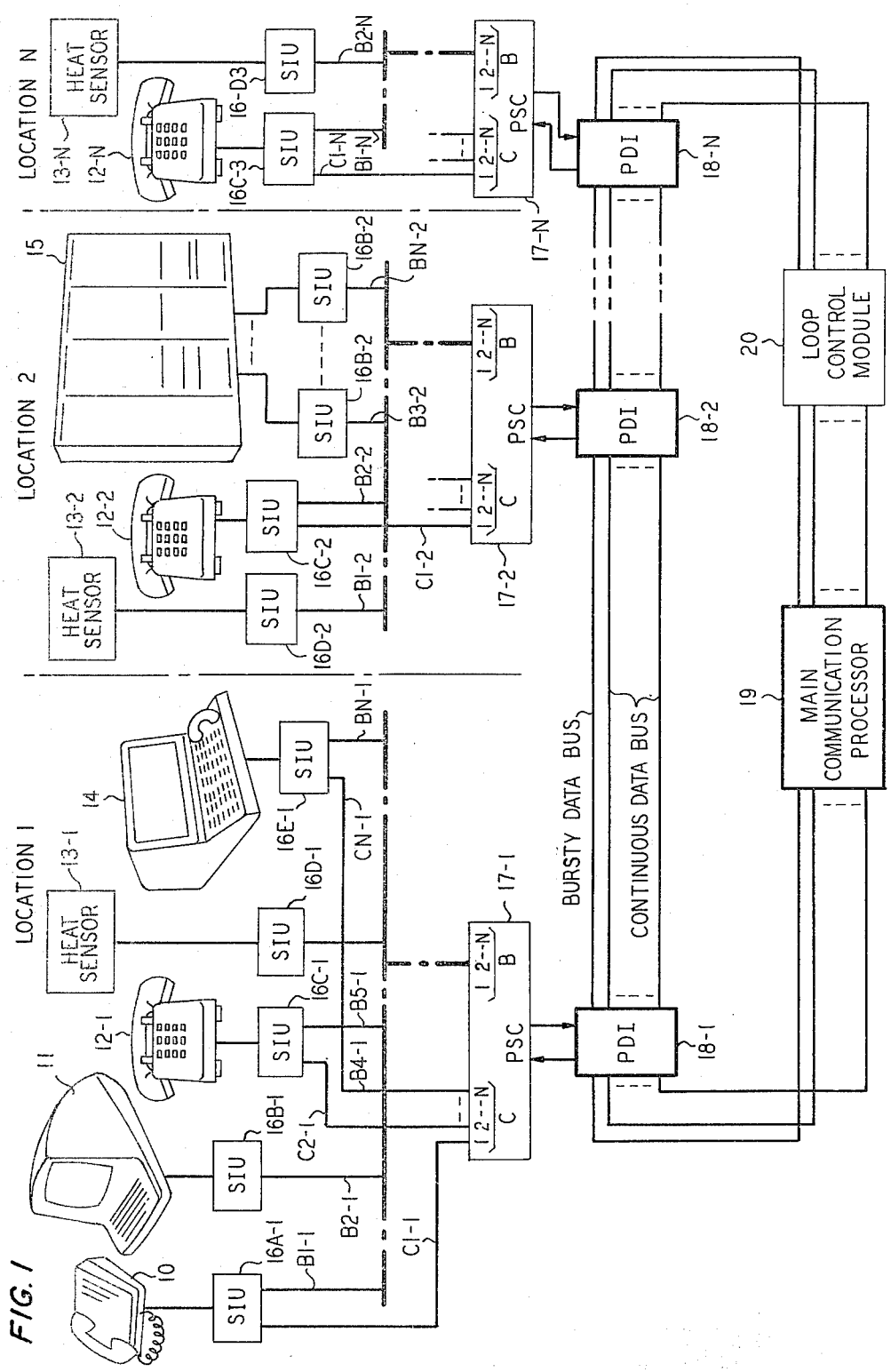
FIG. 1 is a block diagram showing the invention.

In a detailed examination of the operation of the invention it will be helpful to review in general terms the overall operation of the system and the protocol for switching both bursty and continuous data on the same switch. This will be performed with respect to FIG. 1 where a number of programmable data interchangers (PDI's) 18- are connected in series by means of a bursty data bus and one or more continuous data buses. Also connected in series with the programmable data interchangers, by means of the bursty data bus and continuous data bus, is a loop control module 20 and a main communication processor 19. All of these components are connected in series to form a closed loop. The loop implements the switch by providing the mechanism of interconnecting any two programmable data interchangers for the purpose of exchanging bursty data as well as continuous data. The particular word format and means of exchanging data on both the bursty data bus and the continuous data bus will be shown.

The main communication processor 19 provides the necessary management and control of the switching loop for establishing and removing connections between a given pair of programmable data interchangers for the purposes of allowing two stations to communicate together. The loop control module 20 provides the function of housekeeping and error detection of both the bursty data bus and continuous data bus. The operation of loop control module 20 is the subject of concurrently filed commonly assigned copending patent application Ser. No. 062,425 in the name of Baxter and Cummiskey, which aplication is hereby incorporated by reference.

If typical telephone station 10 communicates with telephone set 12-N, a continuous data connection must be established between the two stations. This path would be via station interface unit 16A-1, programmable station controllers 17-1, programmable data interchanger 18-1, programmable data interchanger 18-N, programmable station controller 17-N and station interface unit 16C-3. During the establishment of this switched connection, main communications processor 19 would be called upon to provide the necessary control to interconnect programmable data interchangers 18-1, 18-N on the switching loop as well as inform the programmable station controllers 17-1, 17-N of the connection to stations 12-1 and 12-N, respectively.

DETAILED DESCRIPTION

The means by which the programmable station controller blends the bursty data inputs and the continuous data inputs from its associated station interface units onto the link to the programmable data interchanger is shown in our previously mentioned copending application. The purpose of each programmable station controller is to combine the data inputs, both bursty and continuous into word format shown in FIG. 2 for transmission to the associated programmable data interchanger in a manner which takes into account the different characteristics of each data type. A 48-bit frame that repeats at an 8 kHz rate is transmitted between the PSC and the PDI. The programmable data interchanger transforms the information arriving from the programmable station controller onto the continuous data bus format shown in FIG. 4 or into the bursty data bus format shown in FIG. 5. The continuous data bus format consists of a 128-bit frame repeating at a 8 kHz rate. The 128 bits are arranged in eight 16-bit time slots. Each time slot is assigned to one continuous data input for the duration of a connection. Under control of supervision of the main communications processor the programmable data interchanger performs the function of transferring each of the two continuous data fields on the link from the programmable station controller to an assigned time slot of the continuous data bus. The time slot of the continuous data bus is assigned under program control by the communication processor.

The bursty data bus frame format, shown in FIG. 5, consists of four 32-bit frames repeating at an 8 kHz rate. Each of these 32-bit fields are available for use on a demand access basis by any of the programmable data interchangers. If a field is presently idle (designated by the busy/idle bit in the message switch time slot format and the call processing field format), then any programmable data interchanger can use that field and correspondingly mark that field busy. The programmable data interchanger performs the function of extracting the information field, address field and function fields from the frame arriving from the programmable station controller and placing that same information in an available 32-bit field on the data bus.

As shown in FIG. 5, the first one bit field is the busy/idle field. The second field designates whether the message eminated from a programmable data interchanger or from the main communications processor. The next field of four bits is the subaddress field. The next field of 12 bits is the address field. The next field of two bits contains the function bits. The next field of eight bits contains the information byte. The next field of one bit is not used. The next field of one bit contains the traffic control indicator for loop management. The last field of one bit is the acknowledgement bit.

The busy/idle field indicates to each of the programmable data interchanger that this 32 frame is available for use by a programmable data interchanger or whether it is presently being used. The subaddress field of four bits designates the station equipment connected to the programmable station controller to which information is to be sent. The 12-bit address is the address of the programmable data interchanger to which the information in this 32-bit time slot is being sent. The function field and the information field contain the information being sent to the specified programmable data interchanger. The traffic control field is used by the loop control module to manage the loop in the presence of malfunctions. The acknowledgement field is set by the receiving programmable data interchanger to indicate that it has received the information contained in the 32-bit time slot.

PROGRAMMABLE DATA INTERCHANGER

Figure 6:
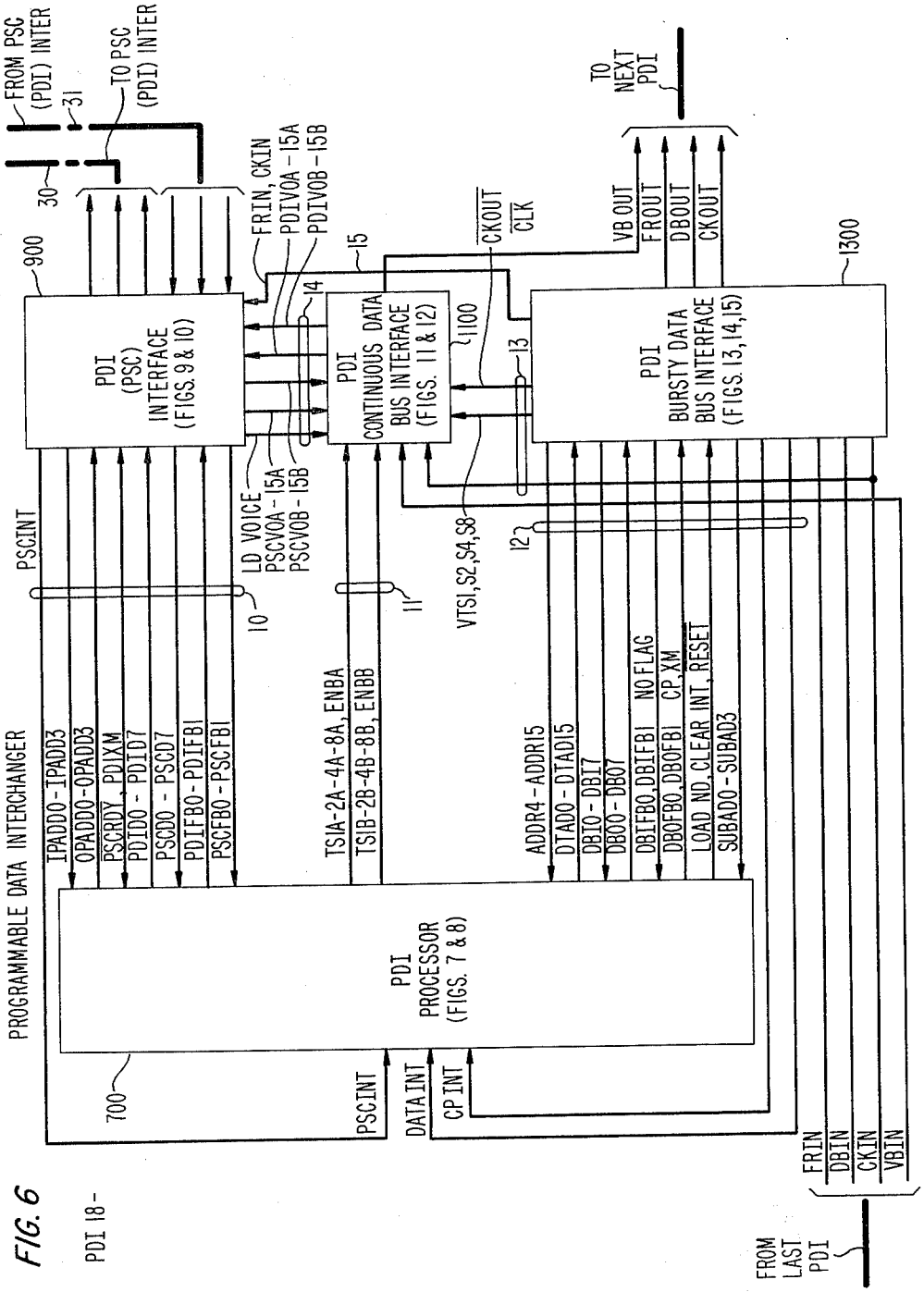
FIGS. 6 through 15 show the programmable data interchanger (PDI)

The block diagram of the programmable data interchanger is shown in FIG. 6. It provides the function of exchanging both bursty and continuous data between itself and other programmable data interchangers by means of bursty and continuous data buses. The processor examines the time slots of the bursty data bus looking for an idle time slot. If not enough time slots are available in a given number of frames for transmission of the received data, then the system is saturated and flow control signals are provided back to the programmable station controller to inhibit further transfer of data. As time slots become available the flow control signals are removed. The programmable data interchanger consists of four functional units. These units are the programmable station interface 900, the continuous data bus interface 1100, the bursty data bus interface 1300 and the programmable data interchanger processor 700. The programmable station controller interface connects the PDI to the serial link connecting it to the programmable station controller. The continuous and bursty data bus interfaces connect the PDI to the loop which serially interconnects all of the programmable data interchangers.

THE PROGRAMMABLE DATA INTERCHANGER PROCESSOR

Figure 7:
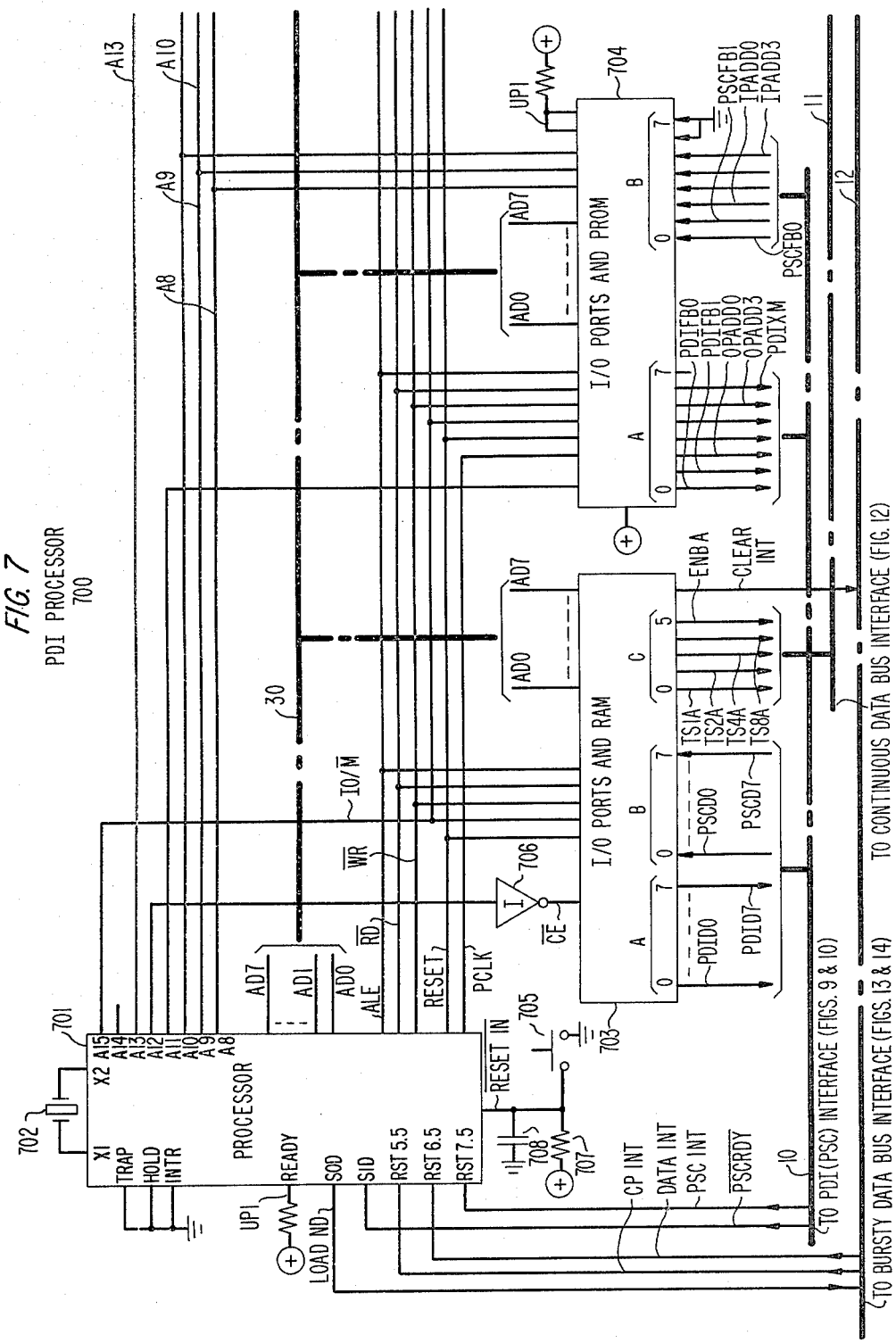
Figure 8:
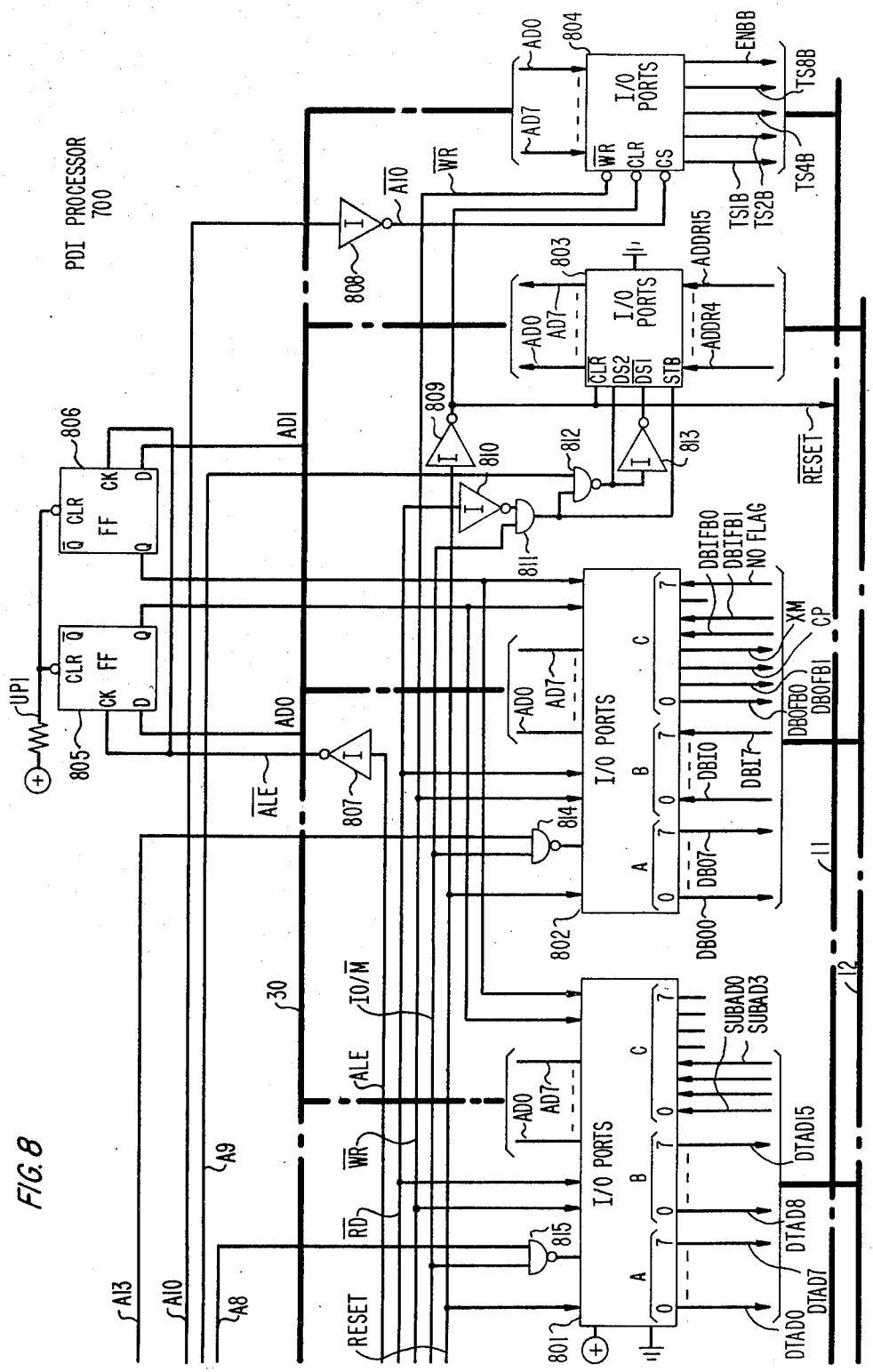

The programmable data interchanger processor 700 is shown in FIGS. 7 and 8. The processor is a standard microprocessor configuration with associated input/output structures such as can be found in the INTEL 8085 microprocessor. The processor consists of processor 701, clock 702, switch 705, resistor 707 and capacitor 708. The program and data memory associated with the processor are shown in ports 703 and 704. The data bus for the processor is shown as cable 30 and the address bus associated with the processor is denoted by A8 through A15. The processor communicates with the three interface modules through a set of I/O ports 703, 704, 801, 802, 803, 804 (FIG. 8).

The programmable data interchanger processor communicates with a programmable station controller interface by means of I/O port 703 and 704. I/O port A of port 703 transfers the information field from the programmable data interchanger to the PSC interface. I/O port A of port 704 transfers to the programmable station controller interface the function field and the port address field. The programmable station controller interface passes the information field to the programmable data interchanger through port B of I/O port 703 and the function field and port address field through port B of I/O port 704.

The processor interfaces to the continuous data bus interface by providing the address of the dedicated time slot of the continuous data bus for each of the two continuous data channels available to the programmable station controller. Port C of I/O port 703 specifies one time slot address. The second time slot address is specified by the port of I/O port 804.

The programmable data interchanger processor communicates to the bursty data bus interface by means of I/O ports 801 through 803. Ports A and B of I/O port 801 specify the subaddress and address fields to the bursty data bus interface. Port C of I/O 802 specifies the function field to the bursty data bus interface. Port A of I/O port 802 specifies the information field. Information from the bursty data bus interface arrives to I/O ports 801 to 803. The subaddress field arrives at port C via I/O port 801. The function field arrives at port C via I/O port 802. The information field arrives at port C via port 802 and the address field arrives at the port via I/O port 803.

PROGRAMMABLE DATA INTERCHANGER INTERFACE TO PROGRAMMABLE STATION CONTROLLER

Figure 9:
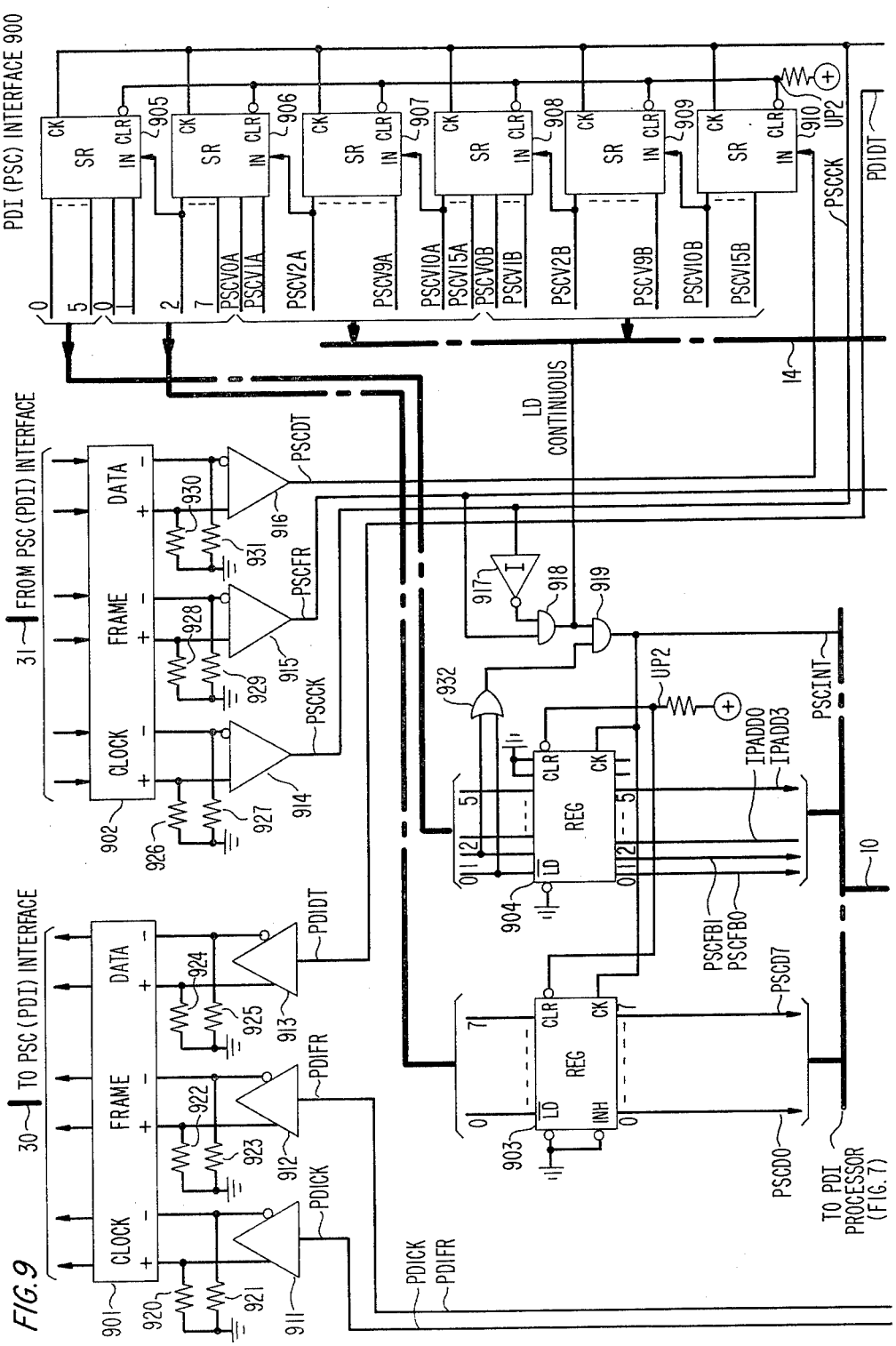
Figure 10:
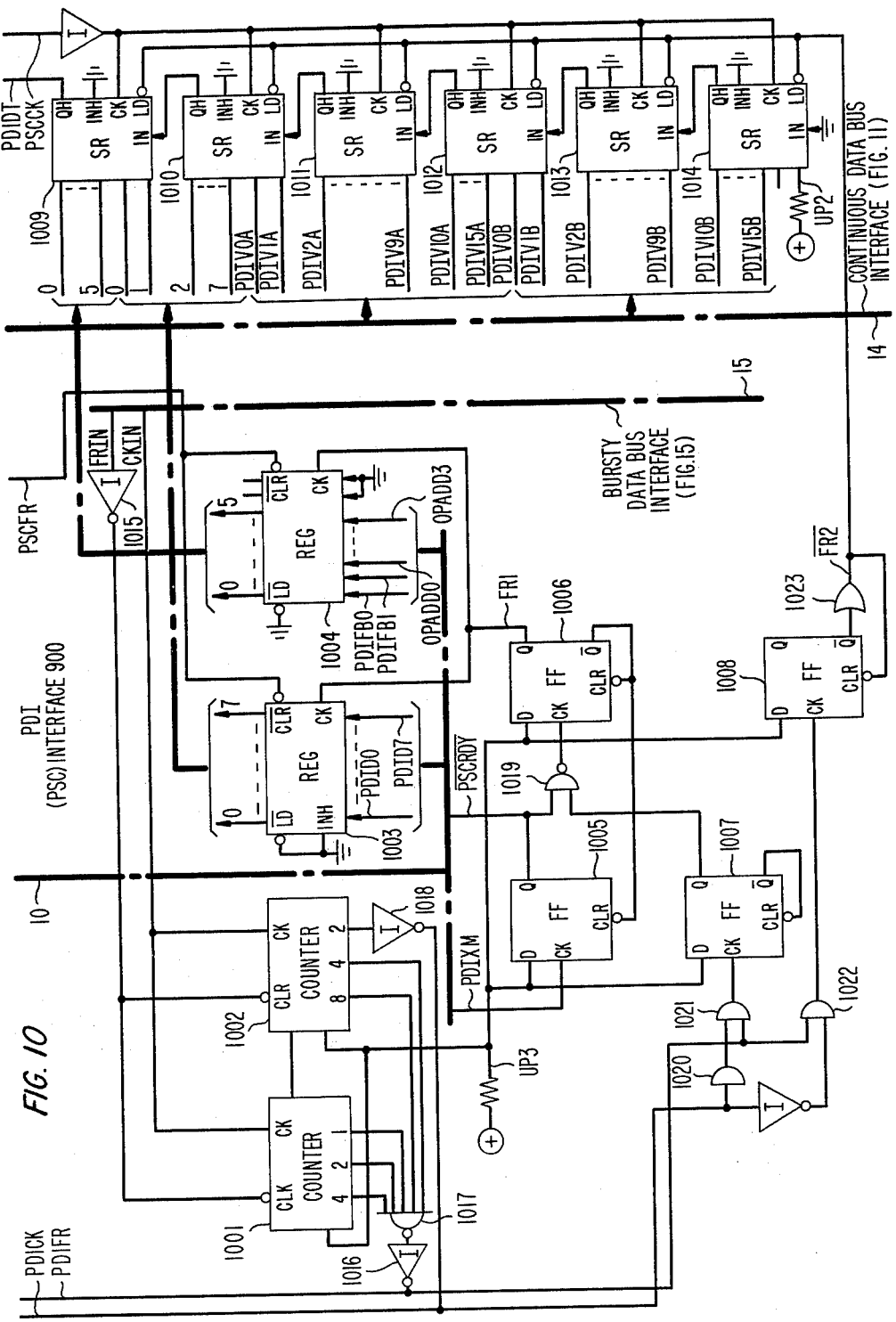

The programmable station controller interface is shown in FIGS. 9 and 10. This interface is a means by which information is exchanged between the programmable station controller and the programmable data interchanger. The serial link connecting the remotely located programmable station controller terminates on the line receivers consisting of components 902, 914–916, and 926–931. The data arrives through receiver buffer 916 which in turn drives the serial to parallel shift register consisting of devices 905–910. The clock signal PSCCK arrives from the programmable station controller through receiver 914 and shifts the incoming data into the serial to parallel shift register. The frame signal PSCFR arrives from the PSC through receiver 915 and controls the strobbing of the data field, the subaddress field and the function field from serial to parallel register 905–910 into the buffer registers 903 and 904. Gates 917–919 and 932 conditionally load these buffer registers upon the condition that the data function and subaddress fields were used during that given frame. The signal PSCINT notifies the processor of the programmable data interchanger that the data field contains informtion for processing. The two continuous data fields arriving from the programmable station controller appear on the continuous data bus interface cable 14.

FIG. 10 contains the circuits for consolidating a frame of information to be sent to the programmable station controller. The two continuous data inputs arrive at the inputs to parallel to serial register components 1009–1014 via the continuous data interface bus cable 14. The information function field and subaddress field arrive at buffer registers 1003 and 1004 via the bursty data bus interface cable 15. Programmable data interchanger transmits signals PDIXM and programmable station controller ready signal PSCRDY. These signals generate strobes for loading the buffer registers 1003 through 1004 by means of components 1005, 1006 and 1007.

The outputs of buffer registers 1003 and 1004 feed parallel to shift register 1009–1014. The frame PSCFR signal and clock PSCCK signal arriving from programmable station controller drive components 1007, 1008, 1020–1023 in order to generate the load clock for the parallel to serial shift register. Clock PSCCK controls the serial shifting of the parallel to serial register. Outgoing clock and framing signals towards the programmable station controller are generated with components 1001, 1002, 1015–1018. The line drivers for driving the link to the programmable station controller consists of components 901, 911–913, 920–925. The output of the serial register 1009–1014 feeds line driver 913. The outgoing frame signal PDIFR arrives line driver 912 and the outgoing clock signal PDICK drives line driver 911.

PROGRAMMABLE DATA INTERCHANGER INTERFACE TO THE CONTINUOUS DATA BUS

Figure 11:
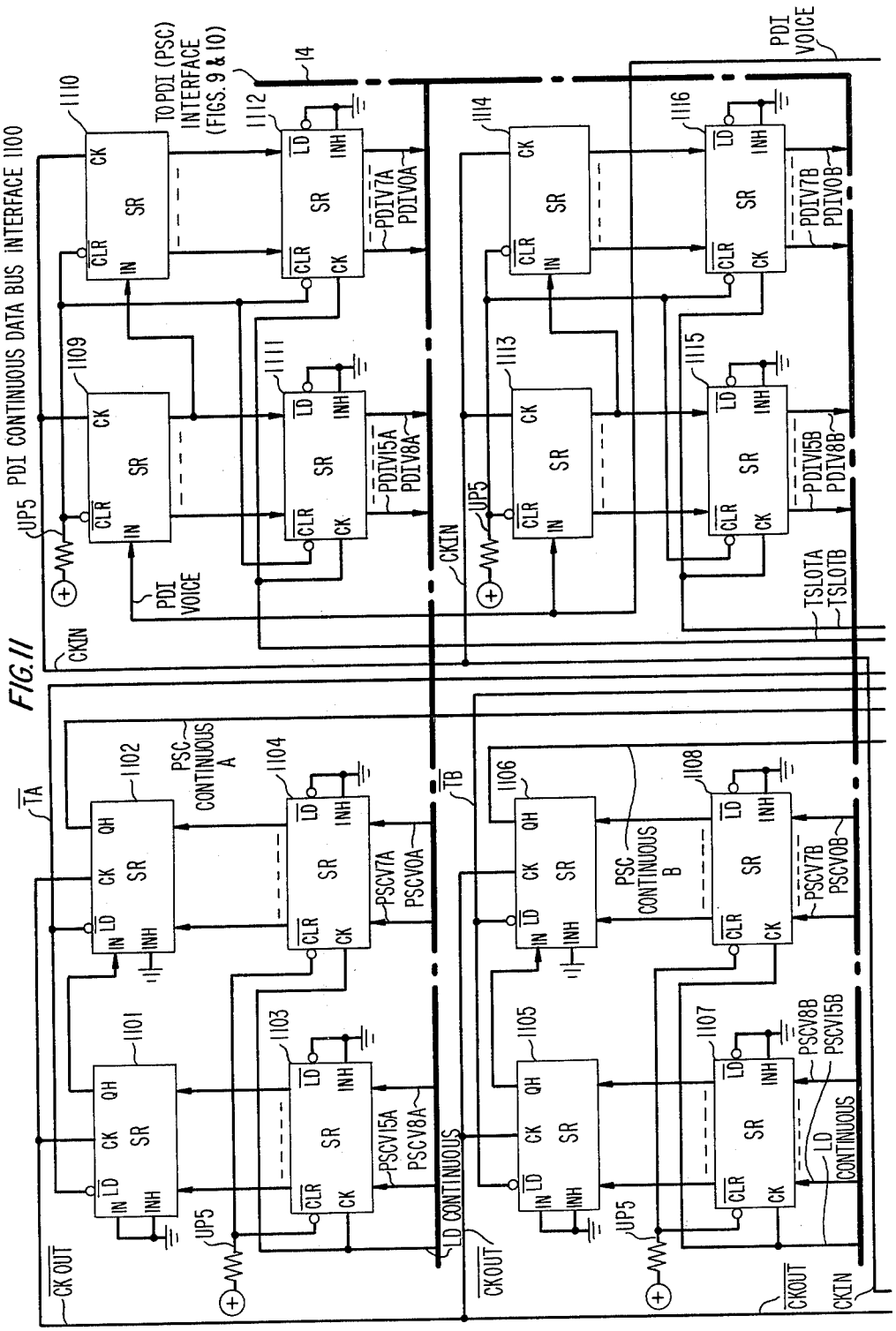
Figure 12:
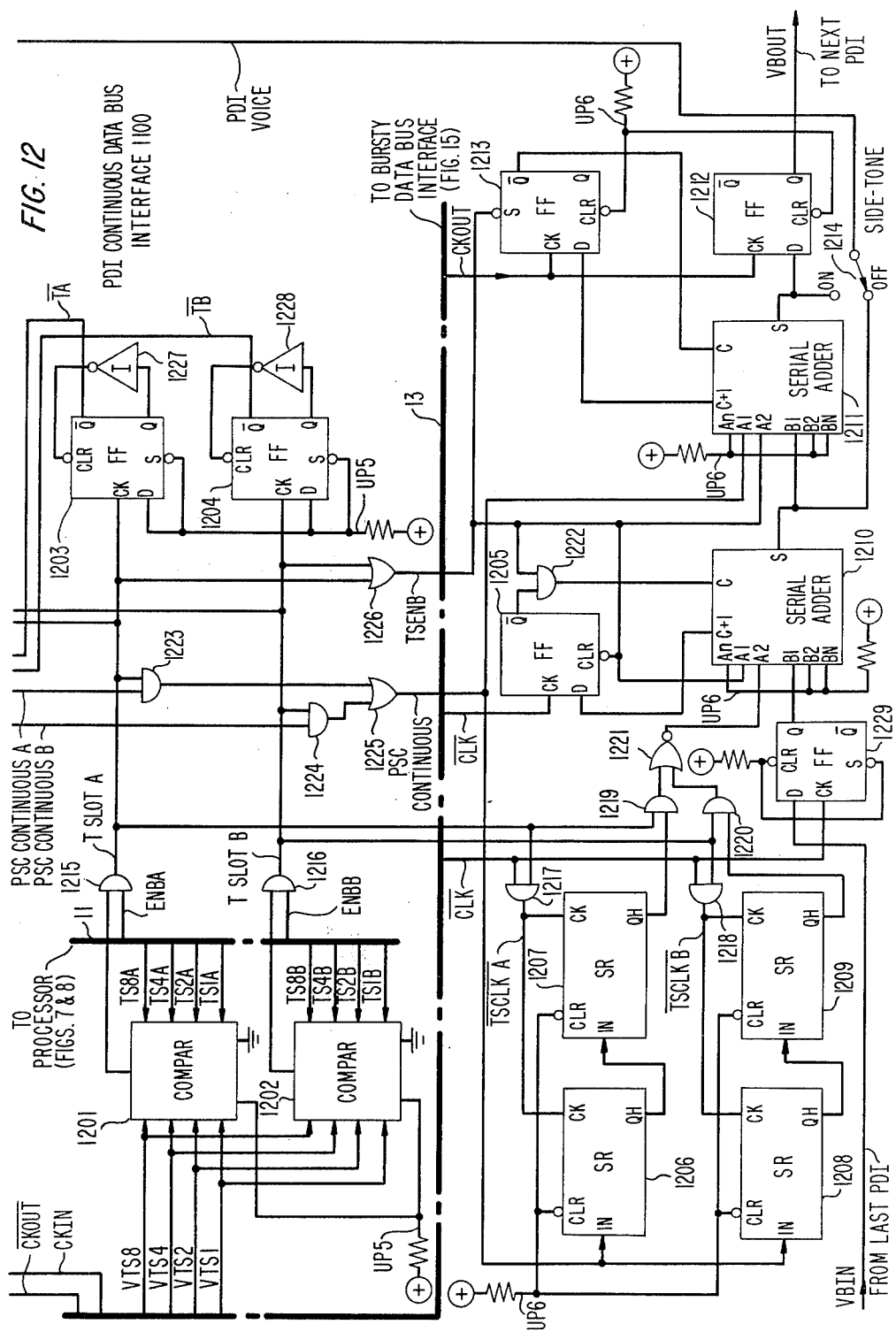

FIGS. 11 and 12 show the continuous data bus interface. The function of the continuous data bus interface is to transfer continuous data between programmable station controller link and the continuous data bus transversing the programmable data interchangers. The input to the continuous data bus interface signal VBIN arrives from the previous programmable data interchanger connected on the continuous data bus. For the case the continuous data stream represents digitally encoded voice samples, the arriving serial data stream is the accumulated sum of all voice signals from the parties presently engaged in the conversation assigned to the individual time slot. The function of the continuous data bus interface is to subtract out the voice sample contributed on the previous frame by this programmable data interchanger and replace it with the voice sample of the present frame that arrived from the programmable station controller.

This function implements voice conferencing when more than two parties are active in a conversation. To those skilled in the art the interface circuit can be easily modified to disable the accumulation circuit to affect the replacement of incoming data by outgoing data for those cases in which the continuous data bus is used for data that is not digitally encoded voice samples and therefore is not accumulated by the programmable data interchanger. The continuous data samples arriving from the programmable station controller interface are loaded into buffer registers 1103 and 1104 for one continuous data channel and 1107 and 1108 for the second continuous data channel. The continuous data samples are then loaded into parallel to serial shift registers 1101 and 1102, and 1105 and 1106. The load signal TA of component 1203 affects the transfer of the information from buffer register 1103 and 1104 to parallel to serial registers 1101 and 1102. The signal TB of component 1204 affects the transferring from buffer register 1107 and 1108 to parallel to shift register 1105 and 1106.

The low signals TA and TB are generated from components 1201–1204, 1215 and 1216, 1227–1228. The signals VTS1-VTS8 arrive at comparators 1201, 1202, indicating the present time slot on the continuous data bus. The two comparators compare the present time slot with that time slot designated for continuous data sample A and B. Upon finding a match the comparator 1201 output subsequently feeds gate 1215, 1203, 1227 to generate time slot A signal and comparator 1202 feeds gate 1216, 1204, 1228 to generate the TB signal.

Suppose that the present time slot arriving into the continuous data bus interface matches time slot A designated by TS1A to TS8A supplied to comparator 1202. At this point the parallel to serial register 1101 and 1102 is loaded with the continuous data sample arriving from the programmable station controller. Serial shift registers 1206, 1207 contain the previous continuous data sample that arrived from the programmable station controller and the least significant bits of each of those shift registers appear at the output of those shift registers. The least significant bit of the data arriving on the VBIN appears at the Q output of component 1229. Serial adder 1210, 1205 and 1222 subtracts the previous sample residing at 1206, 1207 from the incoming stream supplied by the Q output 1229. The serial adder 1211 and 1213 adds the present sample to the output of the serial subtractor 1210 to provide at the output S of 1211 the updated accumulated sum of all participants of the conversation residing in time slot A. The S output of component 1211 feeds buffer 1212 which supplies the continuous data bus output VBOUT. Switch 1214 can be set to select the updated accumulated sum of all parties in the conversation by selecting the side tone "on" or it can select the accumulated sum of all parties in the conversation except the party associated with this particular programmable data interchanger by selecting side tone "off". The side tone switch connects to serial to parallel shift register 1109 to 1110 associated with transmitting the continuous data sample to the programmable station controller. Once the continuous data sample is shifted in to 1109, 1110, the time slot A signal from component 1215 transfers the information into buffer register 1111, 1112 to make the continuous data available to the programmable station controller interface.

The continuous data sample arriving from the programmable station controller which is serially shifted out of registers 1101, 1102 is also shifted into the serial registers 1206 and 1207 in order to store it for one frame so that on the subsequent frame it can be subtracted from the incoming signal VBIN.

Time slot B works in an exact analogous manner. For time slot B, comparator 1202 indicates the time slot of the continuous data bus frame that is assigned to time slot B. Register 1107 and 1108 is the buffer register in the incoming voice sample from the programmable station controller. Components 1105 and 1106 are the parallel to serial shift register. Components 1208 and 1209 are the serial register for storing the previous continuous data sample. Serial to parallel register 1113 and 1114 receives the serial stream for the continuous data sample to be sent to the programmable station controller, and registers 1115 and 1116 are buffer registers to interface to the programmable station controller interface. Components 1223 to 1226 and 1219 to 1221 are selectors in front of the two serial adders to pick the appropriate of time slot A or time B or neither to feed the serial adders. This description details the interfacing to one continuous data bus. To one skilled in the art, it is easy to modify the interface to include more than one continuous data bus by appending to the time slot assignment the bus assignment as well.

PROGRAMMABLE DATA INTERCHANGER INTERFACE TO THE BURSTY DATA BUS

Figure 13:
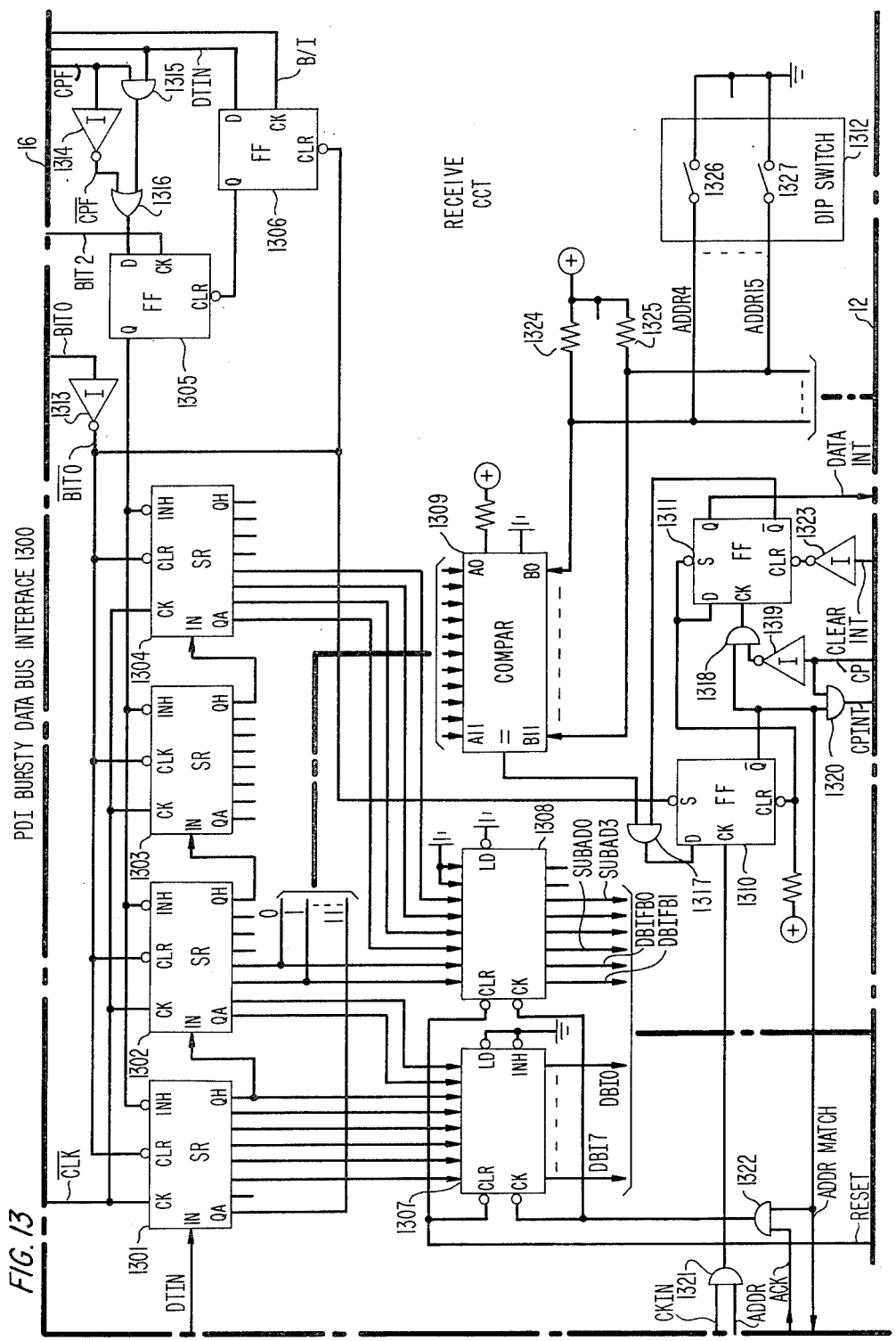
Figure 14:
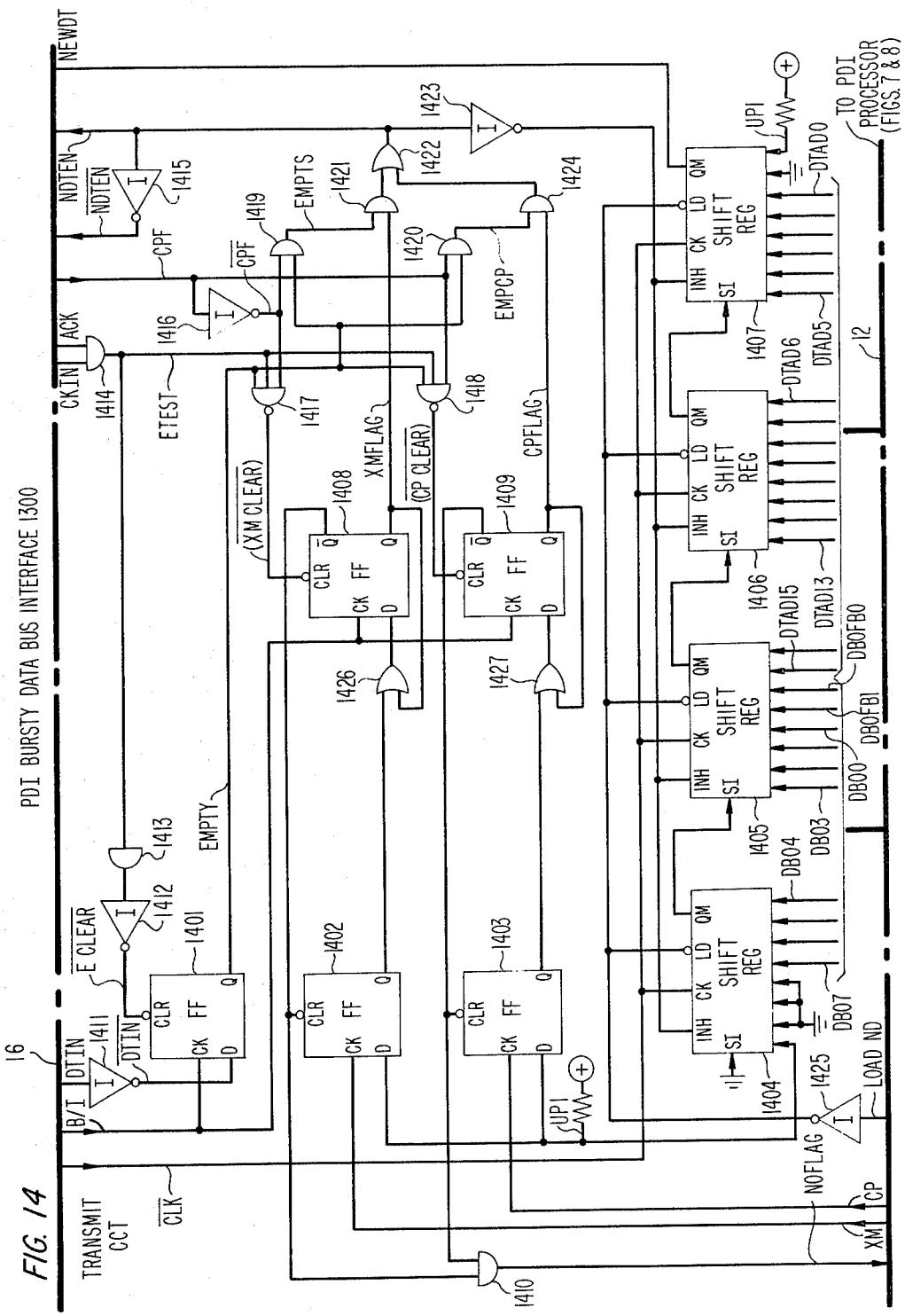
Figure 15:
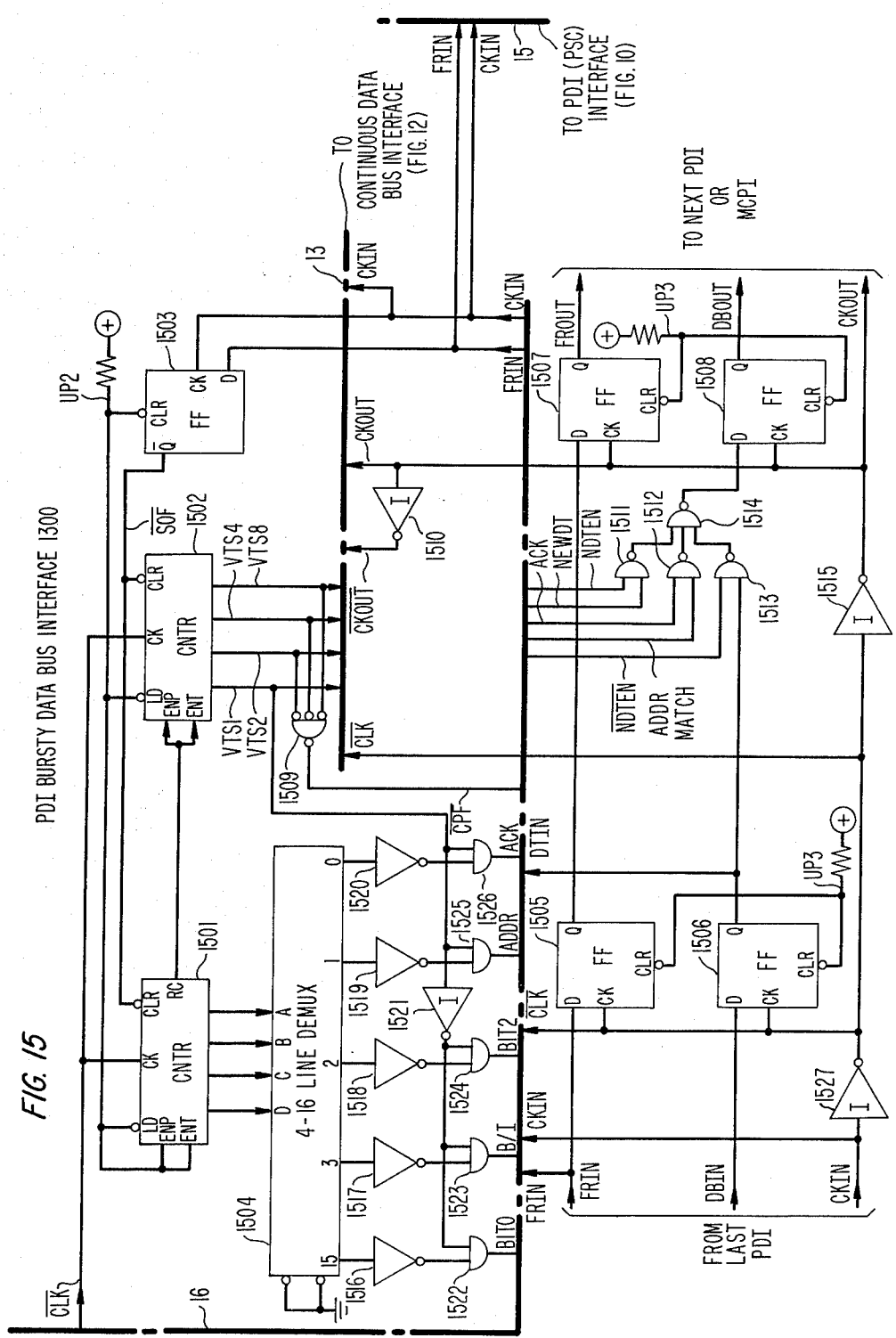

The function of the bursty data bus interface shown in FIGS. 13–15 is to exchange information between the programmable data interchanger and one time slot from the bursty data bus frame. The bursty data bus interface examines the address field of the incoming time slots against its own address looking for a match. Upon finding a match of address, it extracts the data in that time slot from the bursty data bus as well as passes it on to the next programmable data interchanger with the acknowledgement bit of the acknowledgement field set. When the programmable data interchanger has information to put out in either the call processing field time slot or a message switch time slot, the bursty data bus interface scans for the idle time slot and upon finding one, places the information onto the bursty data bus.

The programmable data interchanger bursty data bus interface shown in FIGS. 13 through 15, is connected to the previous programmable data interchanger by means of the bursty data bus consisting of signals frame in, FRIN, data in, DBIN, and clock in, CKIN. These three signals feed components 1505, 1506, 1527 and 1515 for buffering the clock, frame, and data. The frame and clock inputs also drive components 1501–1504, 1509, 1516–1526 to establish the time slot number VTS1-VTS8 and the timing signals BIT0, B/I, BIT2, ADDR, ACK and CPF used throughout the bursty data bus interface. The buffered incoming data at the Q output of 1506 feeds the incoming serial shift register 1301–1304. This register is controlled by components 1305, 1306, and 1313–1316. The busy/idle, B/I, control signal generated by component 1523 clocks the busy/idle bit into component 1306 and in turn clears flip-flop 1305 if the busy/idle bit is set to the busy state. The bit two signal, BIT2, clocks in the second data bit combined with the call processing field indication, CPF, operates to set the Q output of 1305 which then enables the shifting of register 1301–1304 when the time slot of the bursty data bus contains valid information.

When a complete time slot has been shifted into register 1301–1304, the address field from the time slot is directed to 1309. The address of this particular programmable data interchanger is set by switches in 1312 and fed to comparator 1309. The output of the comparator indicating equality of the two addresses is fed to 1317 where it is clocked into 1310 at the time that the address comparison is made, as indicated by the address signal, ADDR, fed to 1321. When the addresses are equal, the $\overline{Q}$ output of 1310 fed through 1322 strobes the information field function field, and subaddress field into buffer register 1307–1308 to make these fields available to the programmable data interchanger processor.

The $\overline{Q}$ output of 1310 feeds 1311, 1318, and 1320 to generate control signals to the processor of the programmable data interchanger. The signals CPINT and DATA INT inform the processor of incoming data from the burst data bus in the call processing and bursty data time slots, respectively.

For information being transferred onto the bursty data bus from the programmable data interchanger, the circuits in FIG. 14 implement this transfer. The function field, information field, address field, and subaddress field are presented in parallel to the parallel to serial register 1404-1407. The load new data signal, LOAD ND, strobes these signals into the register through component 1425. The transmit signal, XM, and call processing signal, CP, strobe enable signals into 1402 and 1403. These signals are respectively clocked into 1408 and 1409 by the busy/idle signal, B/I, of each time slot until such time they are cleared by the transmit clear signal XM CLEAR or the call processing signal CP CLEAR respectively. The transmit clear signal is generated by 1417 when an empty time slot that is not a call processing field time slot is encountered at the end of the time slot established by the acknowledgement bit time, ACK, of gate 1414. The call processing clear signal is generated when an empty time slot that is a call processing field is encountered at the end of that time slot specified by the acknowledgement bit time derived by 1414. If the transmitting of a message switch time slot is requested, an idle time slot is designated by the empty time slot signal ENPTS generated at 1419. It subsequently enables (through gates 1422 and 1423) the shift register 1404-1407 to shift the message switch time slot out on the QM lead of 1407. If a call processing field time slot is requested, an empty call processing field time slot is indicated by EMPCP of component 1420 and it, too, through 1422-1424 enables the shifting of the register 1404-1407. Indications of an empty time slot on the bursty data bus is generated by 1401 in conjunction with 1411-1414.

Component 1507, 1508 and 1511-1515 drive the bursty data bus for transmission of signals to the next programmable data interchanger on the data bus. Component 1511-1514 compose a data selection circuit under control of signals new data enable, NDTEN, address match, ADDR MATCH, and data acknowledge, ACK. These three control signals select one of the three data stream inputs to go out on the bursty data output bus DBOUT through buffer flip-flop 1508. If the present time slot on the bursty data bus arriving at the input DBIN contains valid information, then that data is passed through 1513 on out to the outgoing bursty data bus. If that busy time slot was directed to this programmable data interchanger then the acknowledgement bit at the end of the frame must be set to indicate reception by this PDI of the time slot information. The address match signal along with the acknowledgement signal ACK at gate 1512 implements this function. If the time slot was originally idle or empty and this programmable data interchanger has information to be sent on the bursty data bus, then the idle time slot is replaced with the new data NEWDT under control of the new data enable signal NDTEN at gate 1511. The information serial in the parallel to shift register 1404-1407 is gated through this component 1511 on out to the bursty data output bus. Buffer register 1507 and 1508 along with component 1515 resynchronize the data and clock for transmission on the bursty data bus to the subsequent programmable data interchanger.

THE MAIN COMMUNICATIONS PROCESSOR

The main communications processor provides the function of controlling the entire system in order to provide communications services and features among the various station apparatus connected to the system. The control information from the station apparatus is passed to and from the main communication processor by means of the call processing field on the bursty data bus circulating around the loop among the programmable data interchangers and the main communications processor connected to that same bursty data bus. For example, one function of the main communications processor is to maintain control logic in order to assign time slots on the continuous data buses to station apparatus involved in a common connection. A telephone conversation between two different station apparatus is one such type of continuous data connection.

Figure 16:
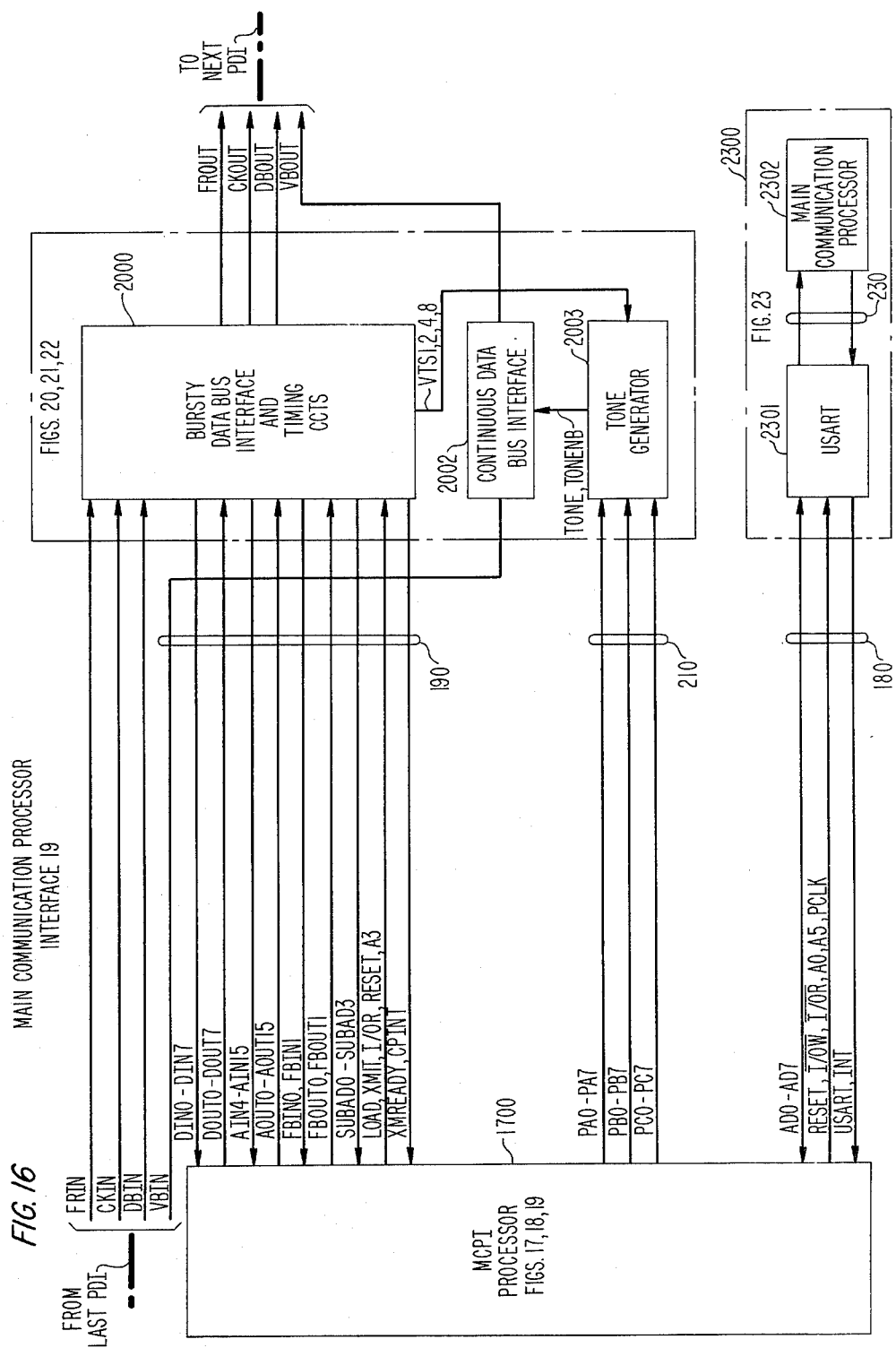
FIGS. 16 through 23 show the main communication processor (MCPI)

FIG. 16 shows the block diagram of the main communications processor interface. This interface connects the main communications processor 2302 to the bursty and continuous data buses through the USART 2301, the main communications processor interface 1700, the bursty data interface 2000 and the continuous data bus interface 2002. Circuits 2000 provide interface to the bursty data bus for extracting and inserting information in the call processing time slot of that bus. A continuous data bus interface provides means for inserting signaling tones into any given time slot on the continuous data buses through tone generation 2003. Examples of such sampling tones are dial tone, busy tone and reorder tone.

THE MAIN COMMUNICATIONS PROCESSOR INTERFACE PROCESSOR

Figure 17:
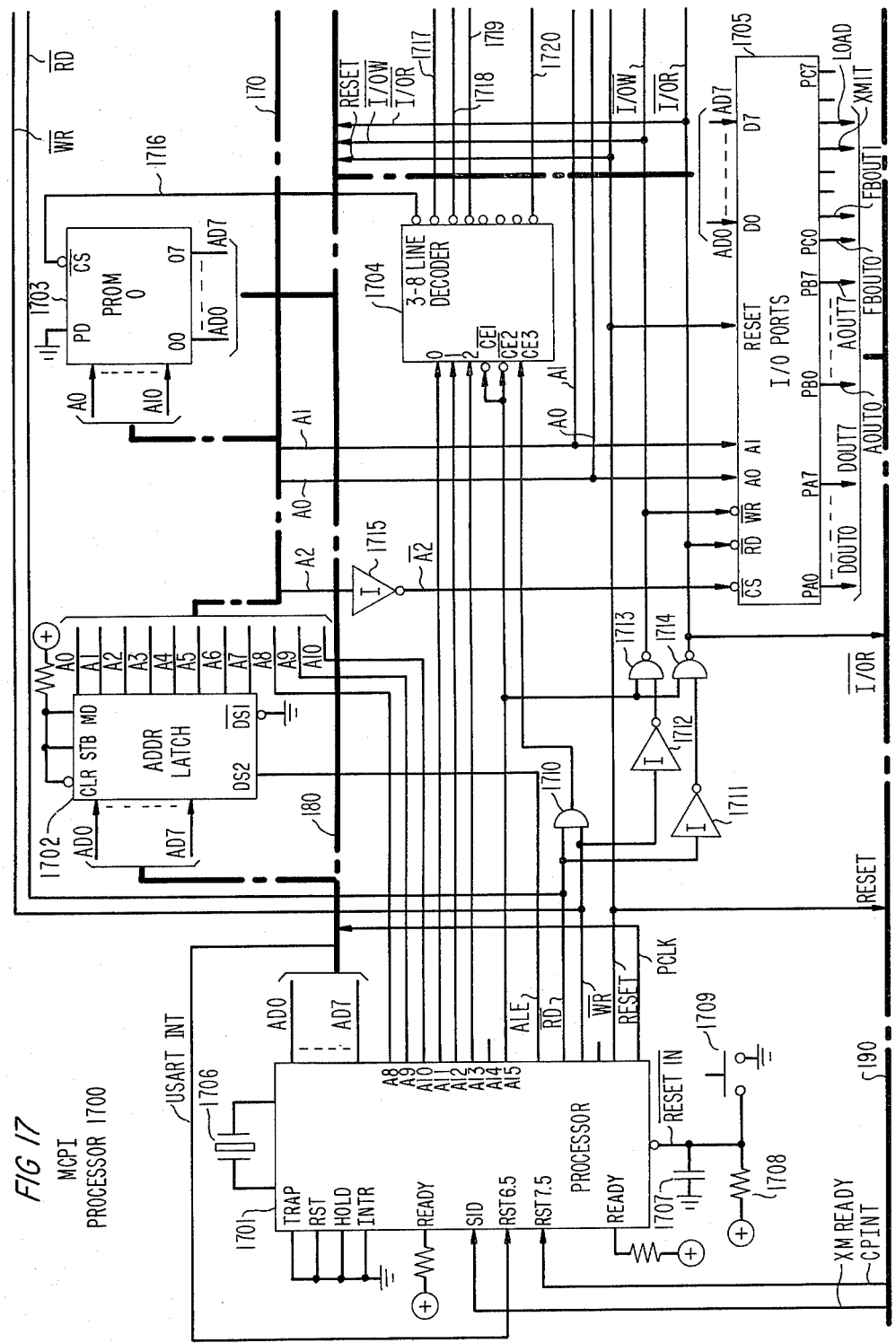
Figure 18:
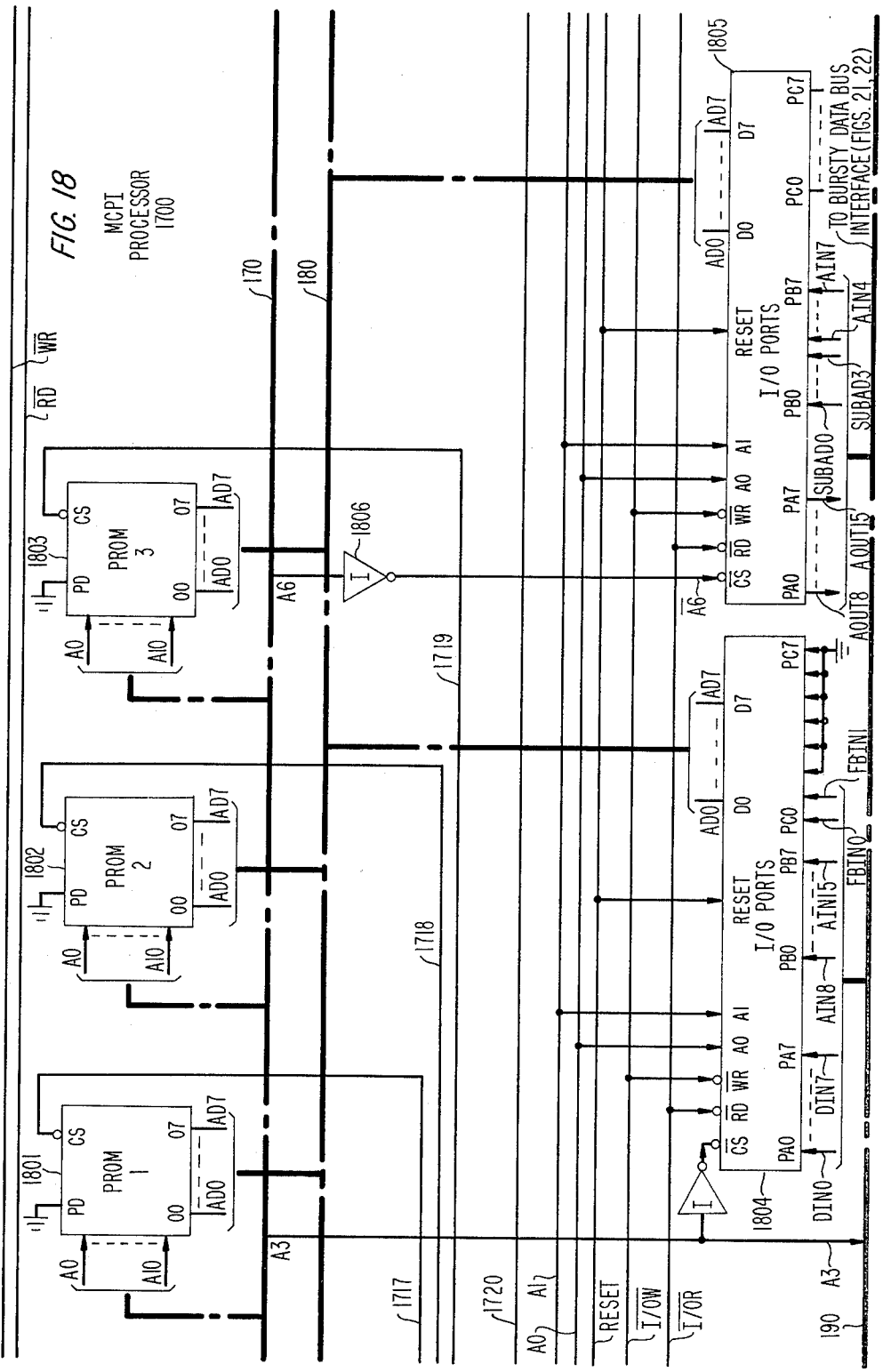
Figure 19:
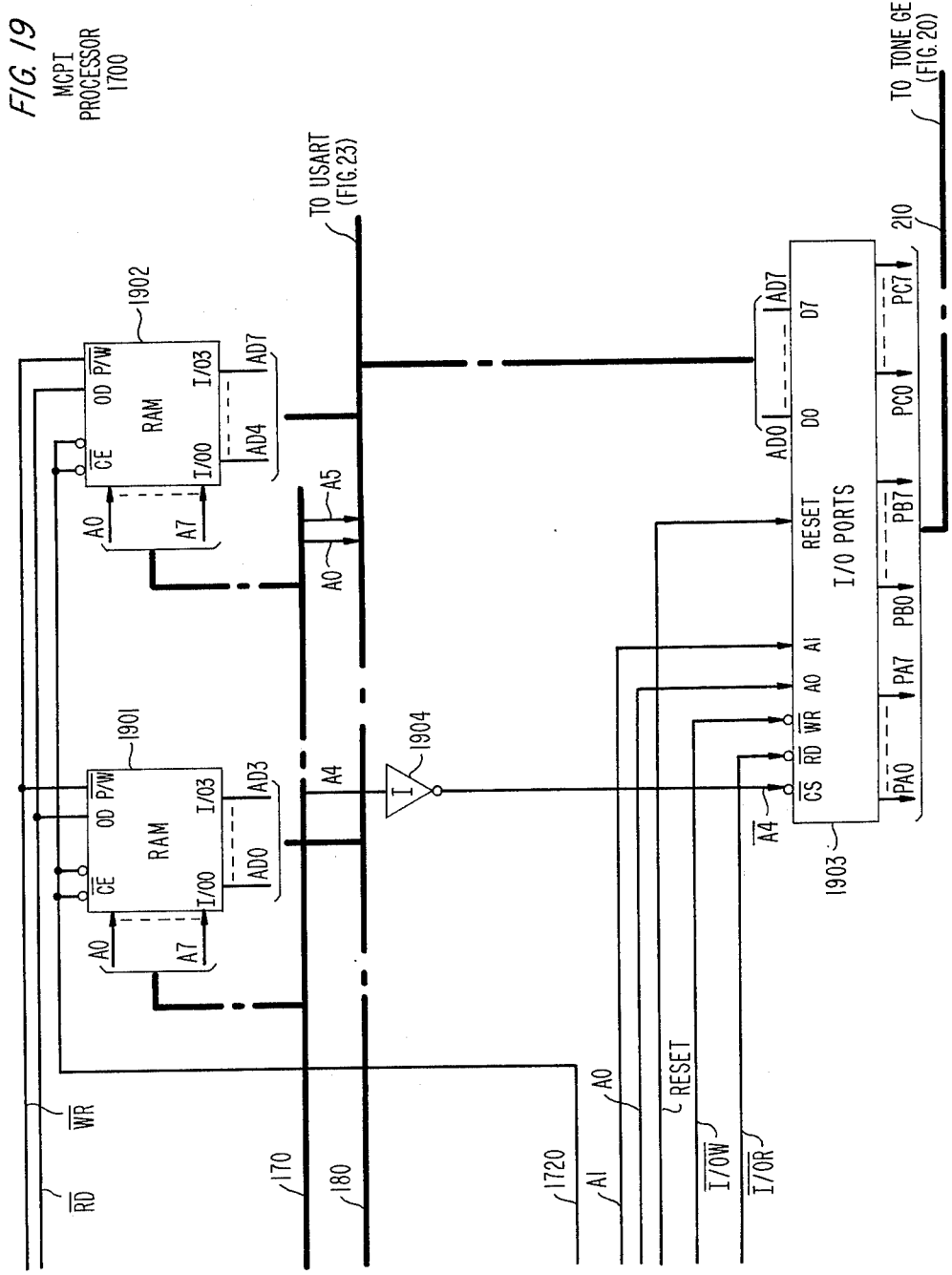

FIG. 17 through 19 detail the microcomputer section 1700 of FIG. 16 that implements the microcomputer control of the main communication processor interface. Components 1701-1702, 1704 and 1706-1714, combine to form the processor section of the microcomputer. Components 1703, 1801-1803, 1901 and 1902 are the memory of the microcomputer system. Components 1705, 1715, 1804, 1805, 1806, 1903 and 1904 combine to form the I/O to the bursty data bus and the tone generator circuitry. These circuits provide data exchange between the main communications processor interface microprocessor and the circuits that interface to the continuous and bursty data buses.

MAIN COMMUNICATIONS PROCESSOR INTERFACE TO BURSTY AND CONTINUOUS DATA BUSES

Figure 20:
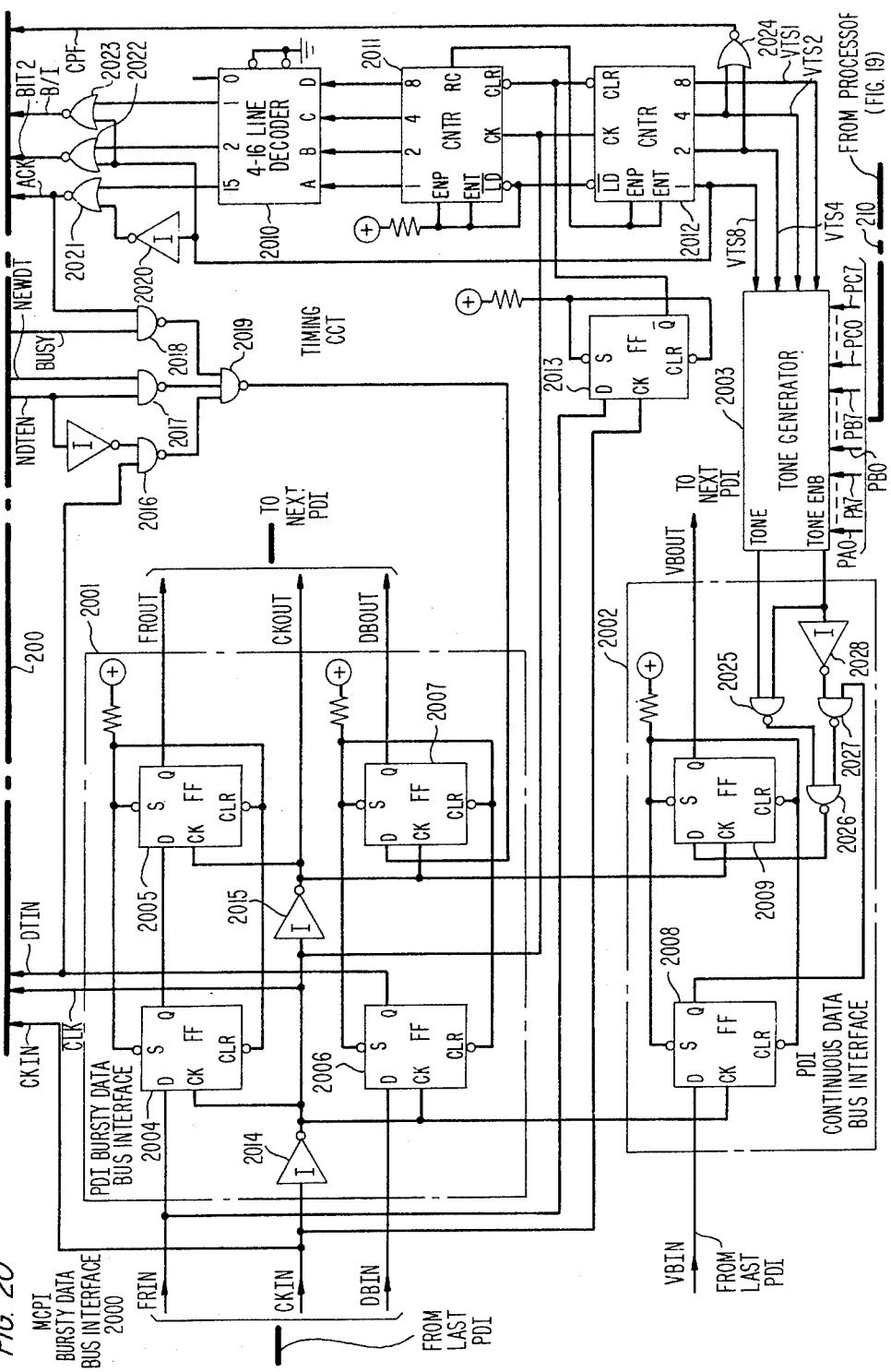
Figure 21:
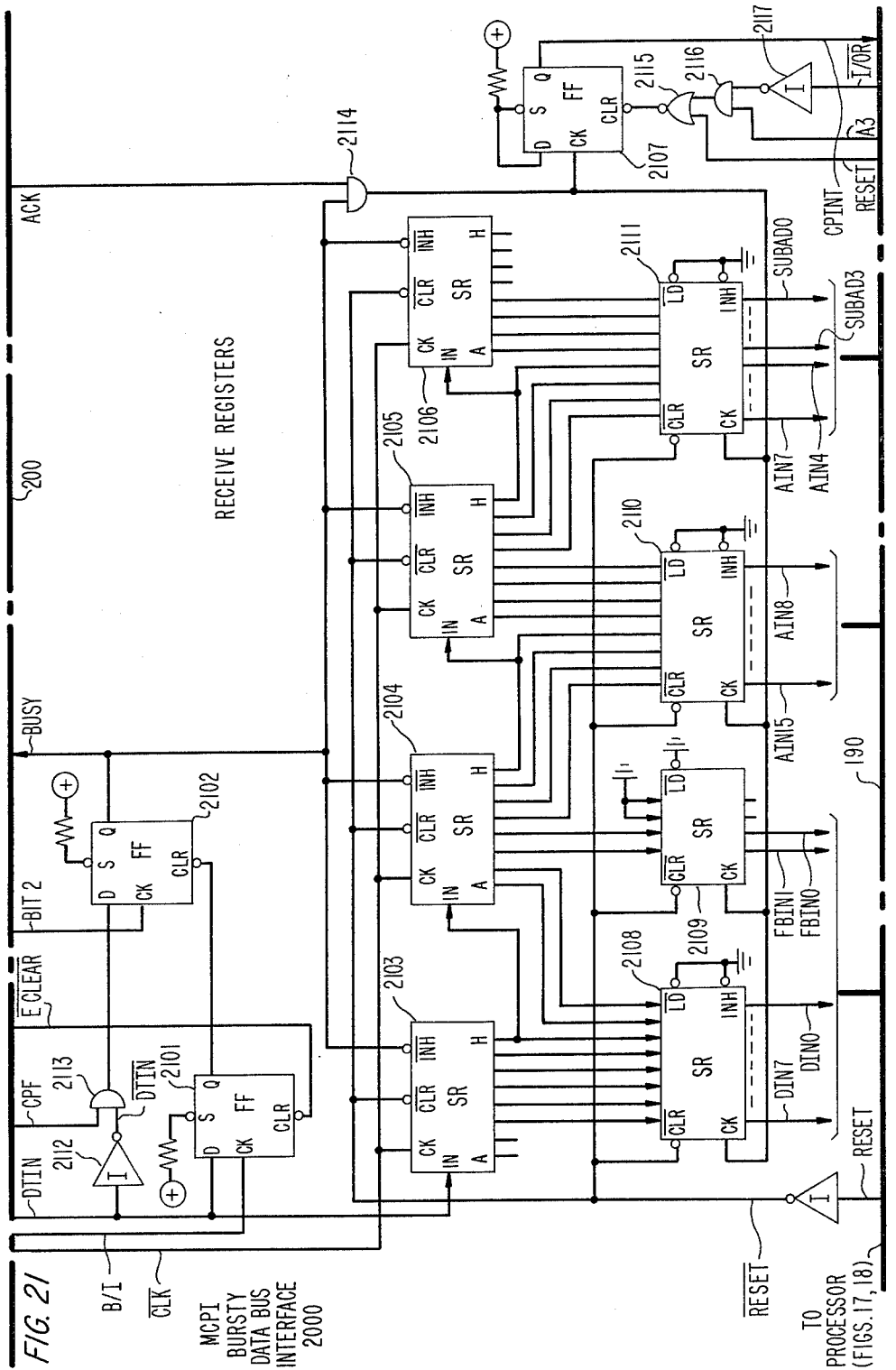
Figure 22:
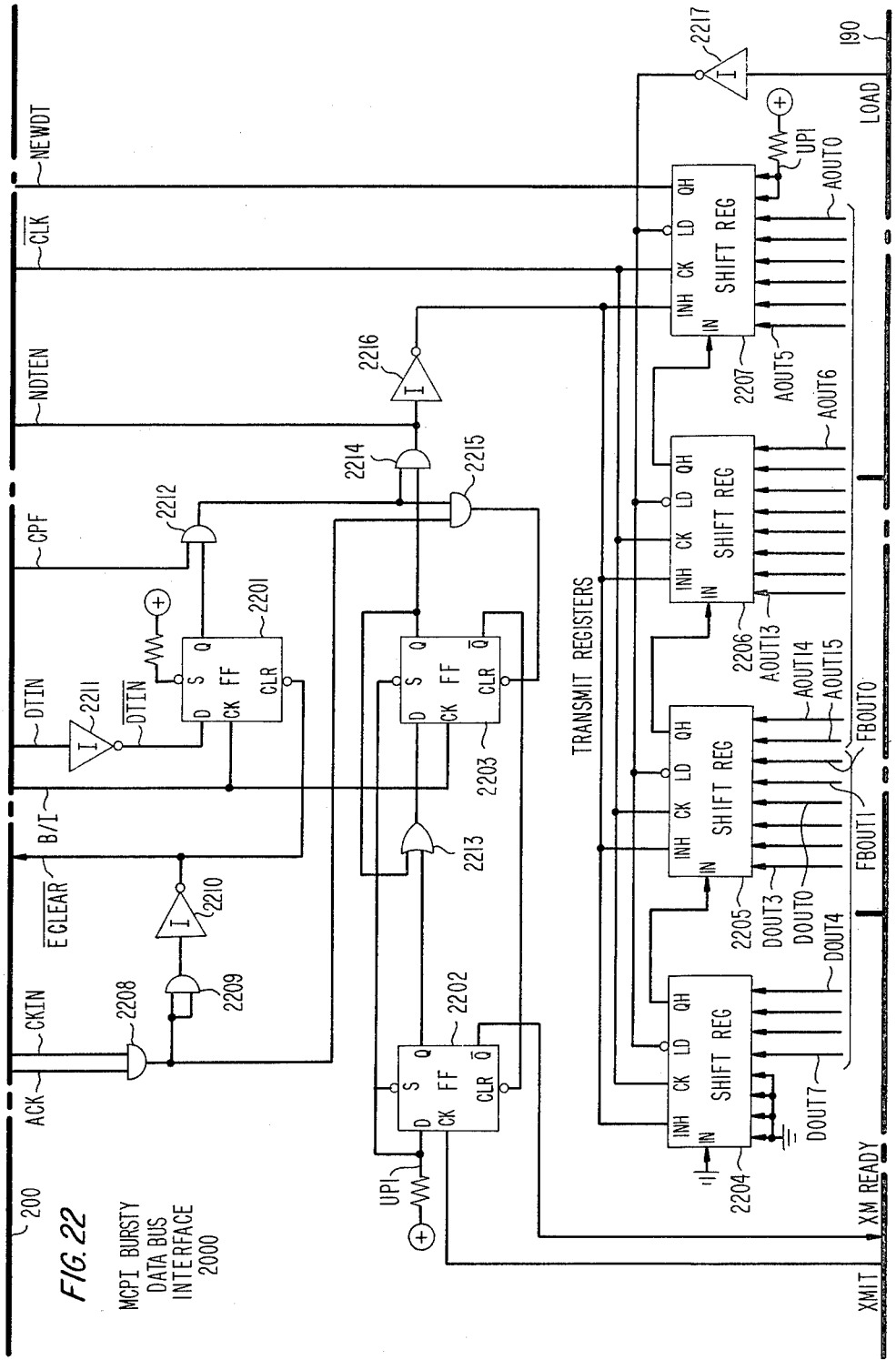

FIGS. 20 through 22 depict the circuits that interface the main communications processor interface microcomputer to the continuous and bursty data buses. FIG. 20 contains the circuitry for inserting the tones generated by the tone generator 2003 in the appropriate continuous data bus time slots. FIG. 21 show the receive circuitry for extracting information out of the call processing time slot of the bursty data bus and FIG. 22 shows the circuitry for inserting information into an idle call processing time slot of the bursty data bus.

The tone generator 2003 receives information from the main communications processor interface via the 24 signal leads PA0-PA7, PB0-PB7, and PC0-PC7 from I/O port 1903 of FIG. 19. These 24 leads indicate the specified time slot of the specified continuous data bus, indicate the tone to be placed in the time slot and indicate whether the tone is being turned on or turned off. These control signals arrive at tone generators 2003. Also shown in FIG. 20 are control circuitry 2010–2013 and 2020–2023. These control circuits indicate the bit position within a time slot and the particular time slot within the frame VTS1, VTS2, VTS4 and VTS8. Control circuits 2025–2028 is a data selector that select either the incoming continuous data VBIN or the tone generator output to be transmitted out on the continuous data bus through circuit 2009 VBOUT to the subsequent programmable data interchanger on the bus. Circuit 2008 buffers the incoming data from the previous programmable data interchanger.

FIG. 21 details the receive circuitry for information being extracted from the call processing time slot on the bursty data bus. This circuit operates in a manner very similar to the circuits already described for the programmable data interchanger. The distinguishing characteristic of these receive registers are that they only receive information in the call processing time slot of the bursty data bus. The information in the bursty data bus is serially shifted through registers 2103–2106. This serially shifted data is loaded in parallel into register 2108–2111 on indication that the call processing field is destined for the main communications processor interface (Q output of 2101). An interrupt CPINT then signals the main communications processor interface microcomputer that data is available for its inspection. Components 2101, 2102, 2112 and 2113 derive indication that the call processing field contains valid information for the main communications processor interface and generates the busy signal.

The microcomputer in the main communications processor interface loads information into registers 2204–2207 through I/O ports 1805 and 1705 for subsequent transmission in the call processing field of the bursty data bus. Components 2201–2203 and 2208–2216 generate control signals XMIT, XM READY, clocks and inhibit signals for controlling the loading and shifting of the transmit registers. New data NEWDT serially shifting out of register 2207 feeds the bursty data bus output selector circuits 2016–2019. These circuits select from among the input data DTIN, the new data NDTEN, and the acknowledge signal ACK for transmission out on the bursty data bus through component 2007 to the next programmable data interchanger.

Figure 23:
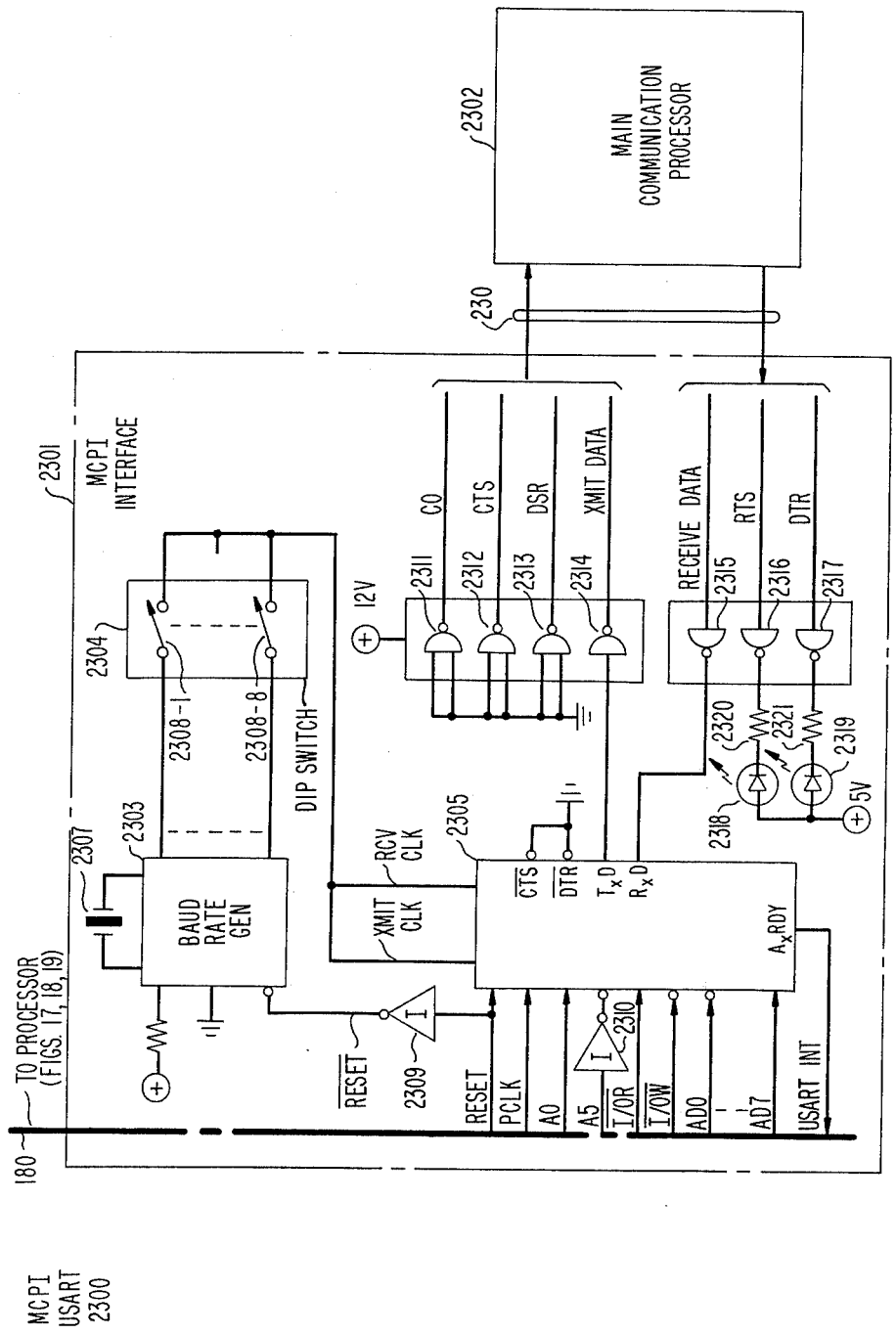
Figure 24:
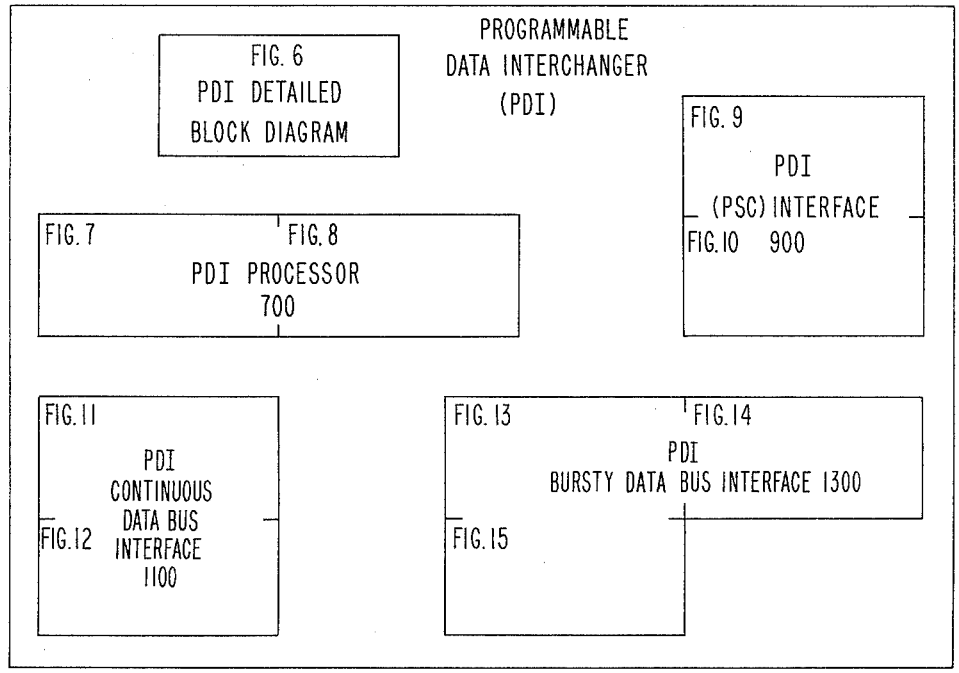
FIGS. 24 and 25 show the layout of the various functional portions of the system.
Figure 25:
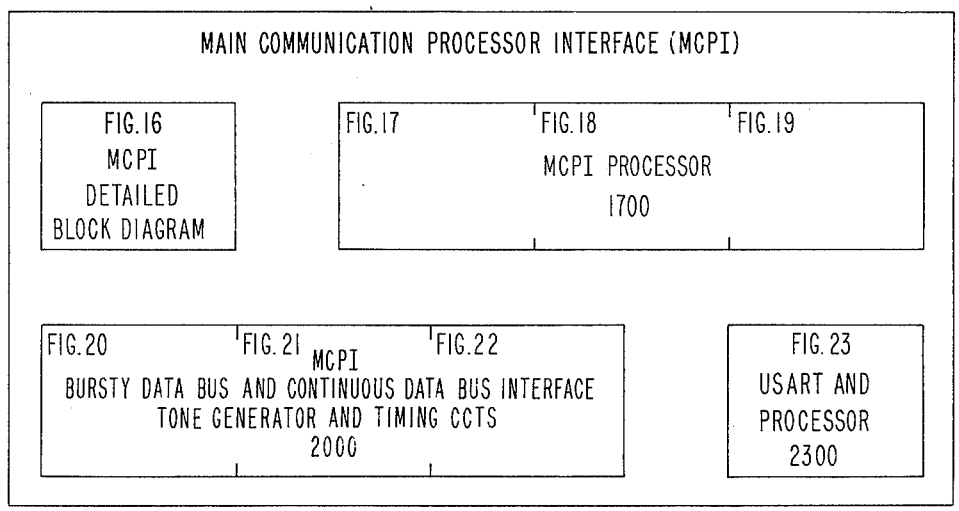

FIG. 23 details the USART that connects the main communications processor interface and the main communication processor. It is a conventional interface that takes a microprocessor bus cable 180 and connects it through the circuits shown in 2301 to the conventional serial interface shown in cable 230. The interface most often used is an Electrical Interface Association RS232 electrical interface for serial, bidirectional, data transmission.

We claim:

1. A digital loop communication system arranged to interconnect data interchangers, each data interchanger arranged to accept digital information in byte interleaved format over a single high speed channel and to place received bytes into a digital loop frame, said loop communication system comprising a controller connected serially in said digital loop.

means for establishing with each frame first, second, and third fields, said first field having time slots for data interchange between said controller and said data interchangers, said second field having time slots assignable under control of said controller to a specific set of data interchangers for data interchange between said assigned data interchangers, said third field having time slots assignable under control of each data interchanger to a selected other one of said data interchangers for one-time data interchanger between said assigning data interchanger and said selected other data interchanger, and means controlled jointly by said controller and said data interchangers for apportioning between said second and third fields the number of time slots available in a given frame.

* * * * *

UNITED STATES PATENT AND TRADEMARK OFFICE
CERTIFICATE OF CORRECTION

PATENT NO. : 4,251,880

DATED : February 17, 1981

INVENTOR(S) : Charles R. Baugh and Robert M. Smith

It is certified that error appears in the above-identified patent and that said Letters Patent are hereby corrected as shown below:

Column 1, line 37, "Ser. No. 062,422" should be followed by --Baugh-Smith 5-9--;

Column 1, line 47, after "To state the" add --problem in other terms, since data from many stations is--.

Column 4, line 46 "in" should be --on--.

Column 6, line 7, misspelled word "informtion" should be --information--;

Column 6, line 37, "arrives" should be --drives--.

Column 11, line 26, "2101" should be --2102--.

Column 12, line 23, "." should be --,--;

Column 12, line 24, "with" should be --within--;

Column 12, line 34, "interchanger" should be --interchange--.

Signed and Sealed this

Thirty-first Day of May 1983

[SEAL]

Attest:

DONALD J. QUIGG

Attesting Officer

Acting Commissioner of Patents and Trademarks